United States Patent
Yoon et al.

(10) Patent No.: US 10,349,171 B2
(45) Date of Patent: Jul. 9, 2019

(54) ELECTRONIC DEVICE, PERIPHERAL DEVICES AND CONTROL METHOD THEREFOR

(71) Applicant: SAMSUNG ELECTRONICS CO., LTD., Suwon-si (KR)

(72) Inventors: Seung-il Yoon, Yongin-si (KR); Kyoung-Shin Jin, Yongin-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/560,342

(22) PCT Filed: Jun. 9, 2016

(86) PCT No.: PCT/KR2016/006119
§ 371 (c)(1),
(2) Date: Sep. 21, 2017

(87) PCT Pub. No.: WO2016/200171
PCT Pub. Date: Dec. 15, 2016

(65) Prior Publication Data
US 2018/0091898 A1    Mar. 29, 2018

(30) Foreign Application Priority Data

Jun. 9, 2015   (KR) .................. 10-2015-0081195
Oct. 21, 2015  (KR) .................. 10-2015-0146650
Jun. 3, 2016   (KR) .................. 10-2016-0069650

(51) Int. Cl.
*H04R 3/00*   (2006.01)
*H04R 5/02*   (2006.01)
(Continued)

(52) U.S. Cl.
CPC ............... *H04R 3/005* (2013.01); *G01S 5/30* (2013.01); *H04M 1/7253* (2013.01);
(Continued)

(58) Field of Classification Search
USPC .............. 381/26, 58, 59, 56, 61, 91, 92, 307
See application file for complete search history.

(56) References Cited

U.S. PATENT DOCUMENTS 5,666,424 A    9/1997  Fosgate et al.
7,428,310 B2   9/2008  Park
(Continued)

FOREIGN PATENT DOCUMENTS

EP    1758308 A1    2/2007
EP    1 962 558 A1  8/2008
(Continued)

OTHER PUBLICATIONS

Search Report dated Sep. 13, 2016, issued by the International Searching Authority in counterpart International Patent Application No. PCT/KR2016/006119 (PCT/ISA/210).
(Continued)

*Primary Examiner* — Yosef K Laekemariam
(74) *Attorney, Agent, or Firm* — Sughrue Mion, PLLC

(57) ABSTRACT

An electronic device is disclosed. The electronic device may include a first speaker configured to output a first audio signal, a second speaker configured to output a second audio signal, a communicator configured to communicate with a peripheral device, and a processor configured to receive information related to a time at which the first audio signal is received and a time at which the second audio signal is received from the peripheral device which receives the first audio signal and the second audio signal and to determine a
(Continued)

distance to and a direction of the peripheral device with reference to the electronic device based on the received information.

16 Claims, 27 Drawing Sheets

(51) Int. Cl.
    *H04S 3/00*     (2006.01)
    *G01S 5/30*     (2006.01)
    *H04M 1/725*     (2006.01)
    *H04S 7/00*     (2006.01)
    *H04N 5/44*     (2011.01)
    *H04N 21/422*     (2011.01)
    *H04N 21/439*     (2011.01)
    *H04N 21/485*     (2011.01)
    *H04N 5/60*     (2006.01)

(52) U.S. Cl.
    CPC ..... *H04N 5/4403* (2013.01); *H04N 21/42222* (2013.01); *H04N 21/439* (2013.01); *H04N 21/4852* (2013.01); *H04R 5/02* (2013.01); *H04S 3/00* (2013.01); *H04S 7/301* (2013.01); *H04S 7/302* (2013.01); *H04S 7/40* (2013.01); *H04N 5/60* (2013.01); *H04N 2005/4428* (2013.01); *H04R 2205/024* (2013.01)

(56) References Cited

U.S. PATENT DOCUMENTS

| | | | |
|---|---|---|---|
| 7,676,044 | B2 | 3/2010 | Sasaki et al. |
| 8,165,317 | B2 | 4/2012 | Ichikawa et al. |
| 8,565,791 | B1* | 10/2013 | Schilit ............... H04W 64/00 |
| | | | 455/41.1 |
| 9,268,471 | B2 | 2/2016 | Na et al. |
| 9,622,076 | B2 | 4/2017 | Park et al. |
| 2013/0201097 | A1* | 8/2013 | Pasquero ............ G06F 3/167 |
| | | | 345/156 |
| 2013/0222230 | A1* | 8/2013 | Choi .................. G06F 3/167 |
| | | | 345/156 |
| 2014/0219483 | A1* | 8/2014 | Hong .................. H04R 5/02 |
| | | | 381/307 |
| 2014/0233755 | A1 | 8/2014 | Kim et al. |

FOREIGN PATENT DOCUMENTS

| | | |
|---|---|---|
| JP | 3370433 B2 | 1/2003 |
| JP | 2007-60253 A | 3/2007 |
| JP | 2008-35251 A | 2/2008 |
| JP | 2008-244773 A | 10/2008 |
| JP | 2009-88601 A | 4/2009 |
| JP | 2010-118838 A | 5/2010 |
| JP | 2011-188248 A | 9/2011 |
| JP | 2014-103456 A | 6/2014 |
| KR | 10-2004-0062054 A | 7/2004 |
| KR | 10-0444025 B1 | 12/2004 |
| KR | 10-2005-0003220 A | 1/2005 |
| KR | 10-0974044 B1 | 8/2010 |
| KR | 10-0988664 B1 | 10/2010 |
| KR | 10-1002844 B1 | 12/2010 |
| KR | 10-1121682 B1 | 4/2012 |
| KR | 10-1253451 B1 | 4/2013 |
| KR | 10-2014-0058996 A | 5/2014 |
| KR | 10-2014-0099122 A | 8/2014 |
| KR | 10-2014-0104215 A | 8/2014 |
| KR | 10-2015-0009027 A | 1/2015 |
| WO | 01/95669 A2 | 12/2001 |

OTHER PUBLICATIONS

Written Opinion dated Sep. 13, 2016, issued by the International Searching Authority in counterpart International Patent Application No. PCT/KR2016/006119 (PCT/ISA/237).
Communication dated Jan. 26, 2018, issued by the European Patent Office in counterpart European application No. 16807811.1.
Communication dated Aug. 15, 2018, issued by the European Patent Office in counterpart European application No. 16807811.1.
Communication dated Apr. 2, 2019, issued by the European Patent Office in counterpart European Application No. 16807811.1.

* cited by examiner

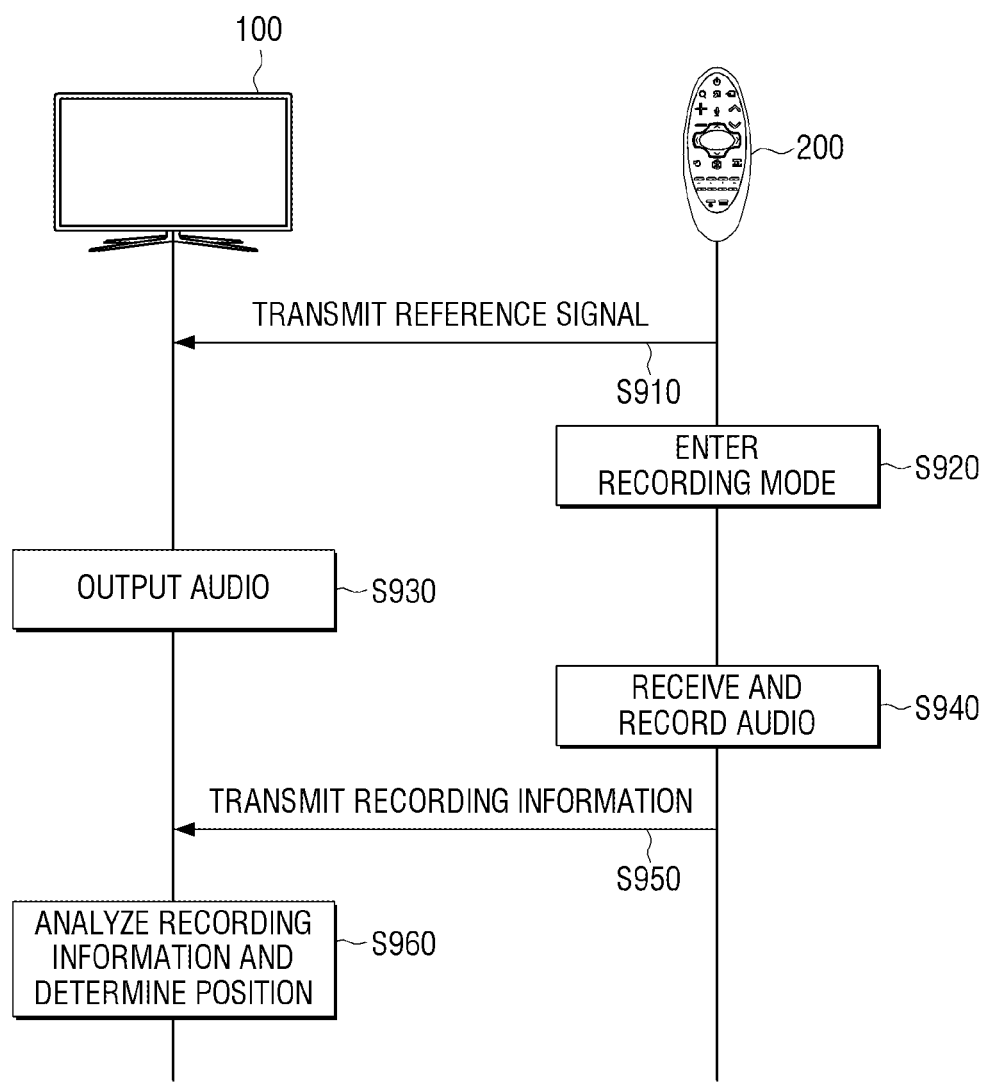

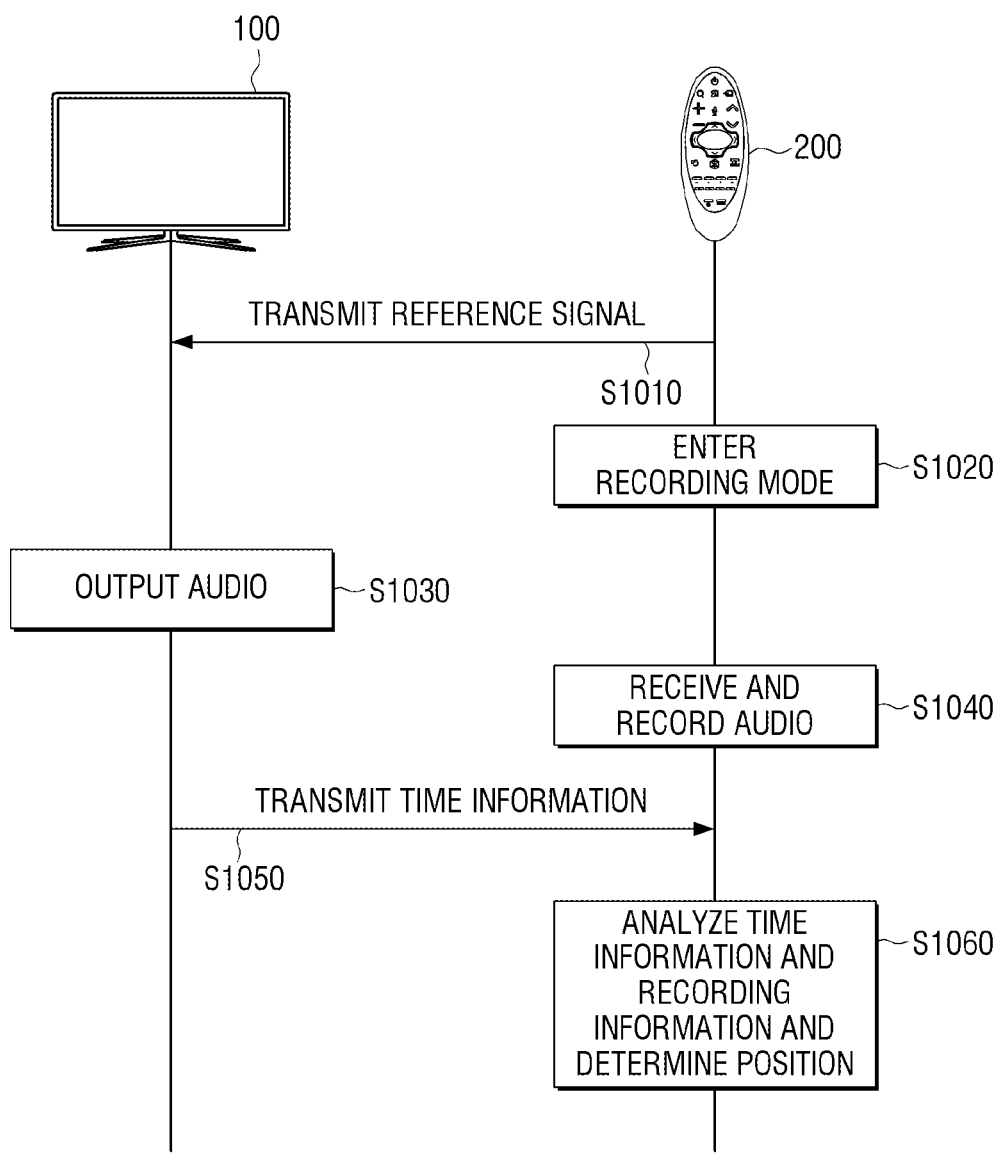

ELECTRONIC DEVICE, PERIPHERAL DEVICES AND CONTROL METHOD THEREFOR

TECHNICAL FIELD

The present disclosure relates to an electronic device, peripheral devices and a control method thereof, more particularly, to an electronic device which can output audio, peripheral devices and a control method thereof.

BACKGROUND ART

With the development of an electronic technology, various types of electronic devices have been developed and distributed. Recently, a variety of types of electronic devices including a TV are used in general homes. Such electronic devices continue to include various functions according to user's needs.

Particularly, a peripheral device such as a remote controller often includes a microphone as the function such as a voice recognition, etc. is added to a remote controller.

DETAILED DESCRIPTION FOR THE INVENTION

Problem to Solve

An aspect of example embodiments relates to an electronic device, peripheral devices and a control method thereof, which identifies the position of each device using the electronic device which can output audio and the peripheral devices which can receive audio and utilizes the identified information in various ways.

Means to Solve the Problem

According to an example embodiment, an electronic device is provided, the electronic device including a first speaker configured to output a first audio signal, a second speaker configured to output a second audio signal, a communicator configured to communicate with a peripheral device, and a processor configured to receive information related to the time at which the first audio signal is received and the time at which the second audio signal is received from the peripheral device which receives the first audio signal and the second audio signal and to determine the distance to and the direction of the peripheral device with reference to the electronic device based on the received information.

The electronic device may further include a storage configured to store information on a predetermined target position which corresponds to the peripheral device, wherein the processor may determine whether the peripheral device is positioned at the target position based on the distance and the direction, and if the peripheral device is not positioned at the target position, the processor may provide the movement information of the peripheral device for arranging the peripheral device at the target position.

The received information may be the information which records the state that the first audio signal and the second audio signal different from the first audio signal are sequentially received through a microphone provided in the peripheral device.

The received information may also include the information of the time at which the first audio signal and the second audio signal different from the first audio signal are sequentially received through the microphone provided in the peripheral device.

The processor may output the first audio signal and the second audio signal simultaneously in response to receiving a reference signal from the peripheral device.

The processor may determine the distance and the direction based on first time information and second time information which are obtained from the received information and which indicate the time at which the first audio signal is received and the time at which the second audio signal is received in the peripheral device, respectively, and third time information which indicates a time difference between the time at which the reference signal is received and the time at which the first audio signal and the second audio signal are output.

The first speaker and the second speaker may be arranged on the right side and the left side of the electronic device, respectively, and the processor may calculate a right side distance by multiplying a time difference between the first time information and the third time information by a velocity value of an audio signal, calculate a left side distance by multiplying a time difference between the second time information and the third time information by a velocity value of an audio signal, and determine the distance and the direction based on the calculated right and left side distances and a distance between the first speaker and the second speaker.

The processor may also output the first audio signal and the second audio signal simultaneously according to a predetermined event, and determine the distance and the direction based on the first time information and the second time information which are obtained from the received information and which indicate the time at which the first audio signal is received and the time at which the second audio signal is received in the peripheral device, respectively, and fourth information which indicates the time at which the event occurs.

The movement information may be the information on a relative position of the peripheral device with reference to the electronic device.

The electronic device may further include a display, and the processor may display through the display a UI screen which indicates the relative position.

The processor may determine whether the peripheral device is positioned at the target position, and display through the display a UI screen which displays movement information of the peripheral device which is for arranging the peripheral device at the target position if the peripheral device is not positioned at the target position.

The peripheral device may include a first external speaker and a second external speaker, and in response to determining that the second external speaker is positioned closer to a target position corresponding to the first external speaker than the first external speaker based on the information related to the time at which the first audio signal is received and the time at which the second audio signal is received from the first external speaker and the second external speaker, respectively, the processor may provide movement information of the second external speaker which is for arranging the second external speaker at the target position corresponding to the first external speaker, and in response to the second external speaker being arranged at the target position corresponding to the first external speaker, the processor may transmit a control signal for operating the second external speaker as the first external speaker to the second external speaker.

In response to the peripheral device being positioned at the target position, the processor may provide information informing that the peripheral device is arranged at the target position.

At least one of the first audio signal and the second audio signal may include identification information for pairing with the peripheral device.

A method for controlling an electronic device including a first speaker and a second speaker is also provided, the method including outputting a first audio signal and a second audio signal through the first speaker and the second speaker, receiving information related to the time at which the first audio signal is received and the time at which the second audio signal is received from a peripheral device which receives the first audio signal and the second audio signal, and determining a distance to and a direction of the peripheral device with reference to the electronic device based on the received information.

The method may further include storing information on a predetermined target position corresponding to the peripheral device, and the determining may include determining whether the peripheral device is positioned at the target position based on the distance and the direction, and providing movement information of the peripheral device which is for arranging the peripheral device at the target position if the peripheral device is not positioned at the target position.

The outputting the first audio signal and the second audio signal may include outputting the first audio signal and the second audio signal simultaneously in response to receiving a reference signal from the peripheral device.

The determining may include determining the distance and the direction based on first time information and second time information which are obtained from the received information and which indicate the time at which the first audio signal is received and the time at which the second audio signal is received in the peripheral device, respectively, and third time information which indicates a time difference between the time at which the reference signal is received and the time at which the first audio signal and the second audio signal are output.

The first speaker and the second speaker may be arranged on the right side and the left side of the electronic device, and the determining may include calculating a right side distance by multiplying a time difference between the first time information and the third time information by a velocity value of an audio signal, calculating a left side distance by multiplying a time difference between the second time information and the third time information by a velocity value of an audio signal, and determining the distance and the direction based on the calculated right and left side distances and a distance between the first speaker and the second speaker.

A peripheral device which communicates with an electronic device including a plurality of speakers is provided, the peripheral device including an audio receiver, a communicator configured to communicate with the electronic device and a processor configured to, in response to a first audio signal and a second audio signal which are output from each of a plurality of speakers provided in the electronic device being received sequentially through the audio receiver, obtain first time information and second time information which indicate the time at which the first audio signal is received and the time at which the second audio signal is received, respectively, from the information which records the received audio signals, and determine a distance to and a direction of the peripheral device with reference to the electronic device based on the first time information and the second time information.

Effect of Invention

According to various example embodiments, the functions added to a peripheral device, etc. can be utilized in various ways, thereby improving user convenience.

THE BRIEF DESCRIPTION OF THE DRAWINGS

FIG. 9 is a sequence diagram illustrating an operation between an electronic device and a peripheral device according to an example embodiment;

FIG. 10 is a sequence diagram illustrating an operation between an electronic device and a peripheral device according to another example embodiment;

Figure 18A:
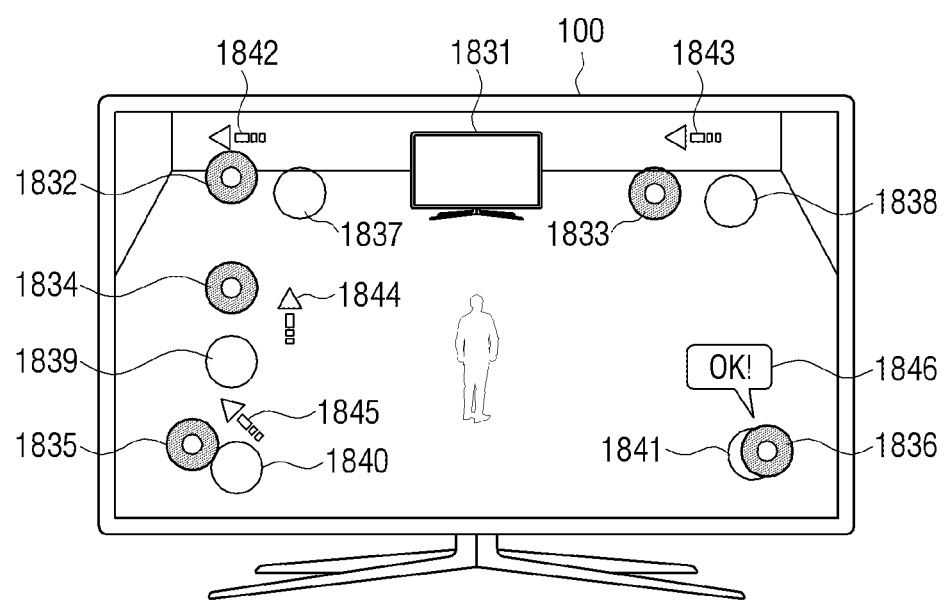
Figure 18B:
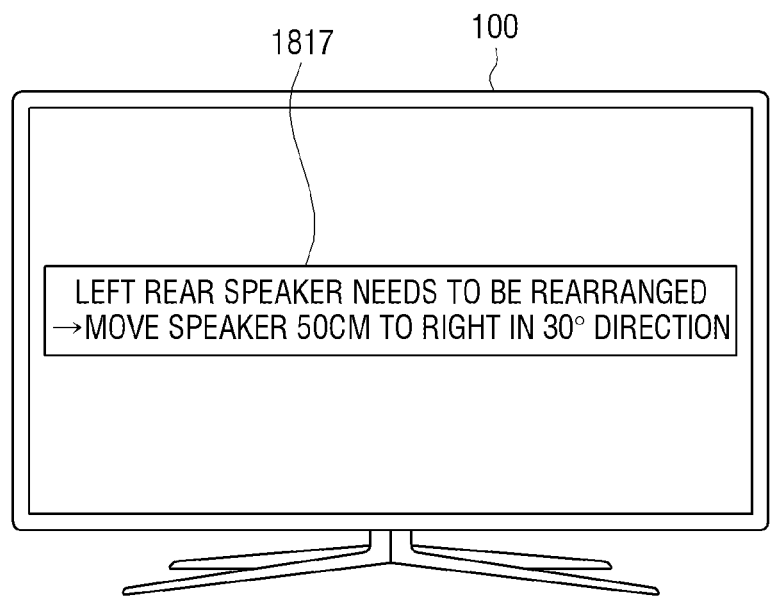
Figure 19:
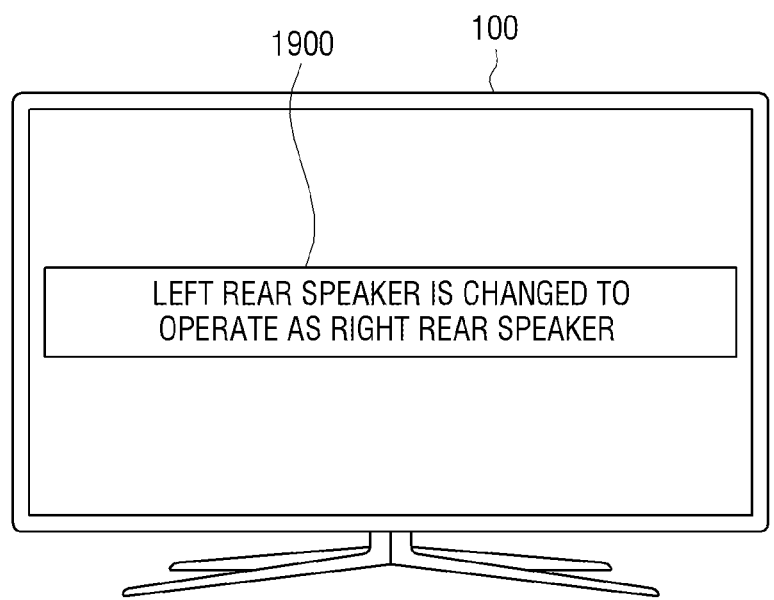
Figure 20:
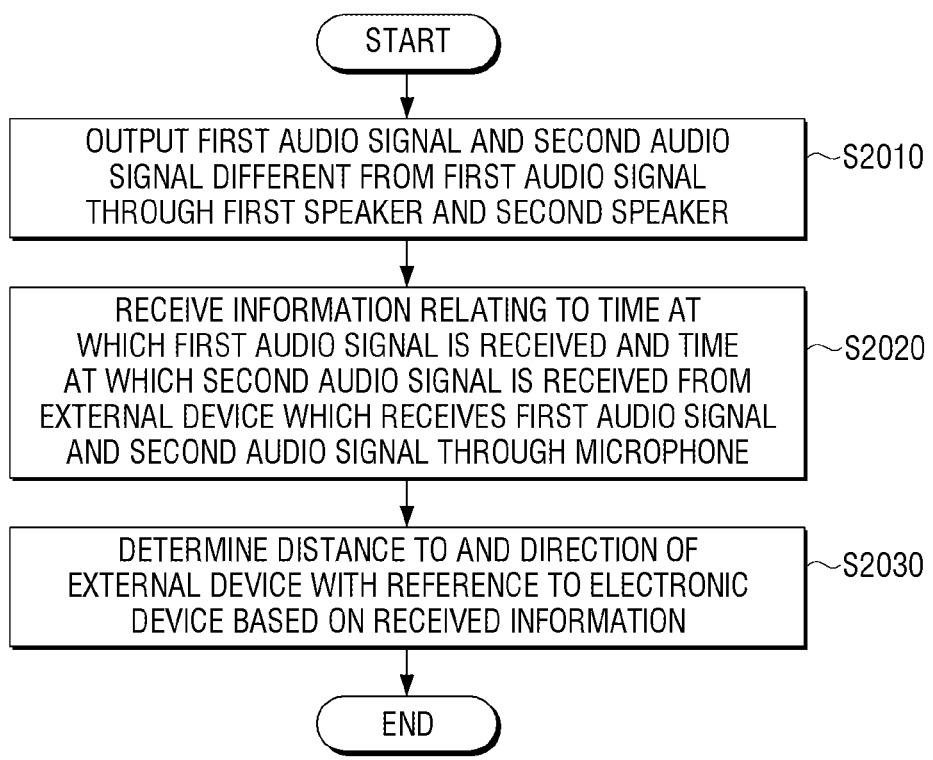
Figure 21:
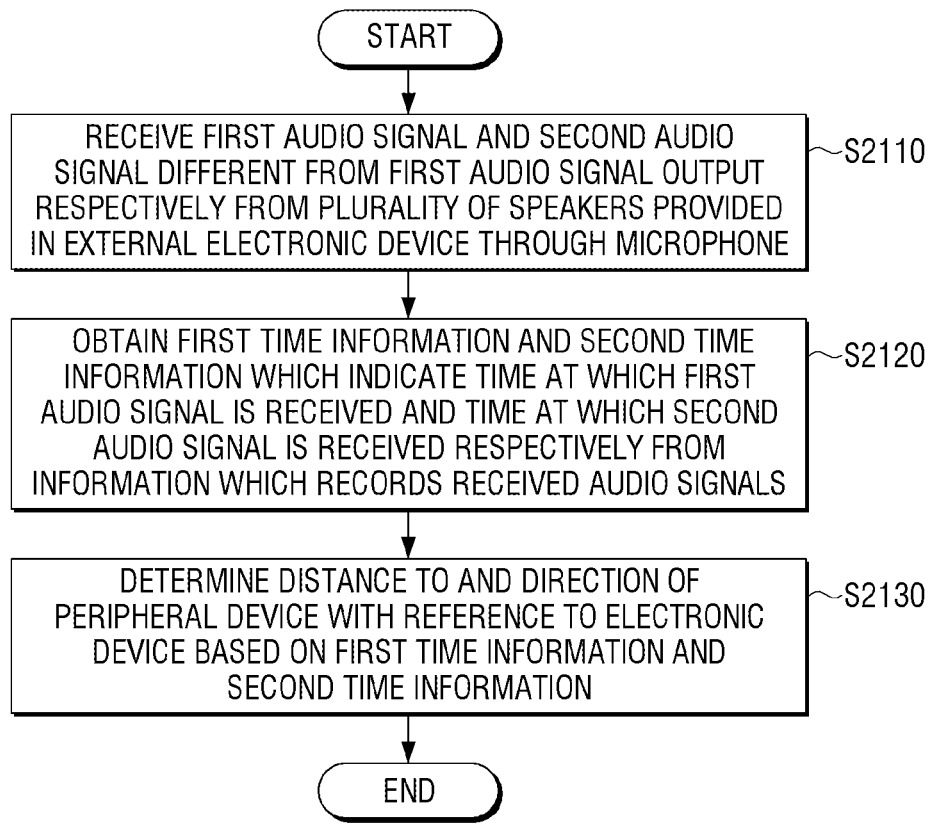
Figure 22:
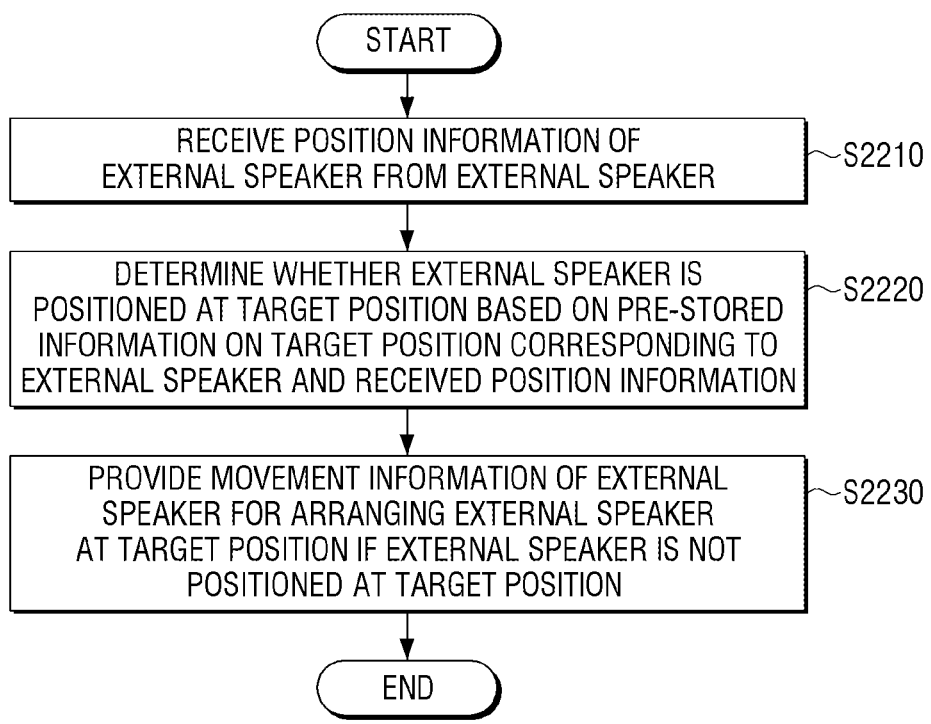
Figure 23:
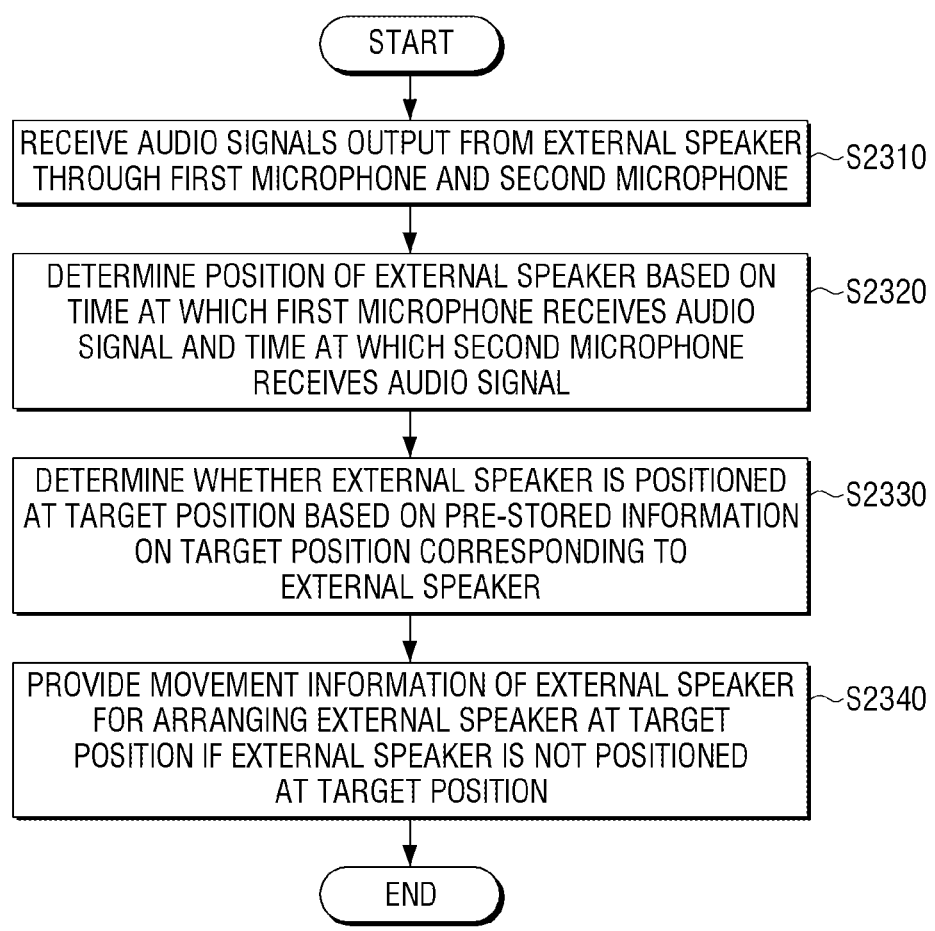

FIGS. 18A, 18B and 19 are diagrams illustrating a UI screen which displays movement information of an external speaker according to an example embodiment; and FIGS. 20 and 21 are flowcharts illustrating a control method of an electronic device and a peripheral device according to various example embodiments; and FIGS. 22 and 23 are flowcharts illustrating a control method of an electronic device and a peripheral device according to various example embodiments.

DETAILED DESCRIPTION OF EXAMPLE EMBODIMENTS

Before describing the present disclosure specifically, a description method of the disclosure and drawings will be provided.

With respect to the terms used in an example embodiment of the disclosure, general terms currently and widely used are selected in view of function with respect to the disclosure. However, the terms may vary according to an intention of a technician practicing in the pertinent art, an advent of new technology, etc. In specific cases, terms may be chosen arbitrarily, and in this case, definitions thereof will be described in the description of the corresponding disclosure. Accordingly, the terms used in the description should not necessarily be construed as simple names of the terms, but be defined based on meanings of the terms and overall contents of the present disclosure.

Also, the same reference numerals or symbols described in the attached drawings denote parts or elements that actually perform the same functions. For convenience of explanation and understanding, the same reference numerals or symbols are used in describing different embodiments. That is, the same reference numerals in a plurality of drawings do not necessarily mean that the drawings are directed to one same embodiment.

Further, terms including ordinal number such as "first," "second," and so on may be used in the description and the claims to distinguish the elements from one another. These terms are used only for the purpose of differentiating one component from another, without limitation thereto. For example, used orders, arrangement orders, or the like of elements that are combined with these ordinal numbers may not be limited by the numbers. If necessary, the numerical expressions may be exchanged between components.

A singular term includes a plural form unless otherwise indicated. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof.

In an example embodiment, 'a module' or 'a unit' performs at least one function or operation, and may be realized as hardware, software, or combination thereof. Further, except the "modules" or "units" that have to be implemented by certain hardware, a plurality of "modules" or a plurality of "units" may be integrated into at least one module and realized as at least one processor (not illustrated).

In an exemplary embodiment, in the case where a part is "connected" to another part, the case also includes a case where the part is "electrically connected" to the other part with another element interposed therebetween. In addition, it will be understood that, when a certain part "includes" a certain element, the certain part may not exclude another element but may further include another element unless this term is defined otherwise.

Hereinafter, the present disclosure will be described in detail with reference to the accompanying drawings.

Figure 1:
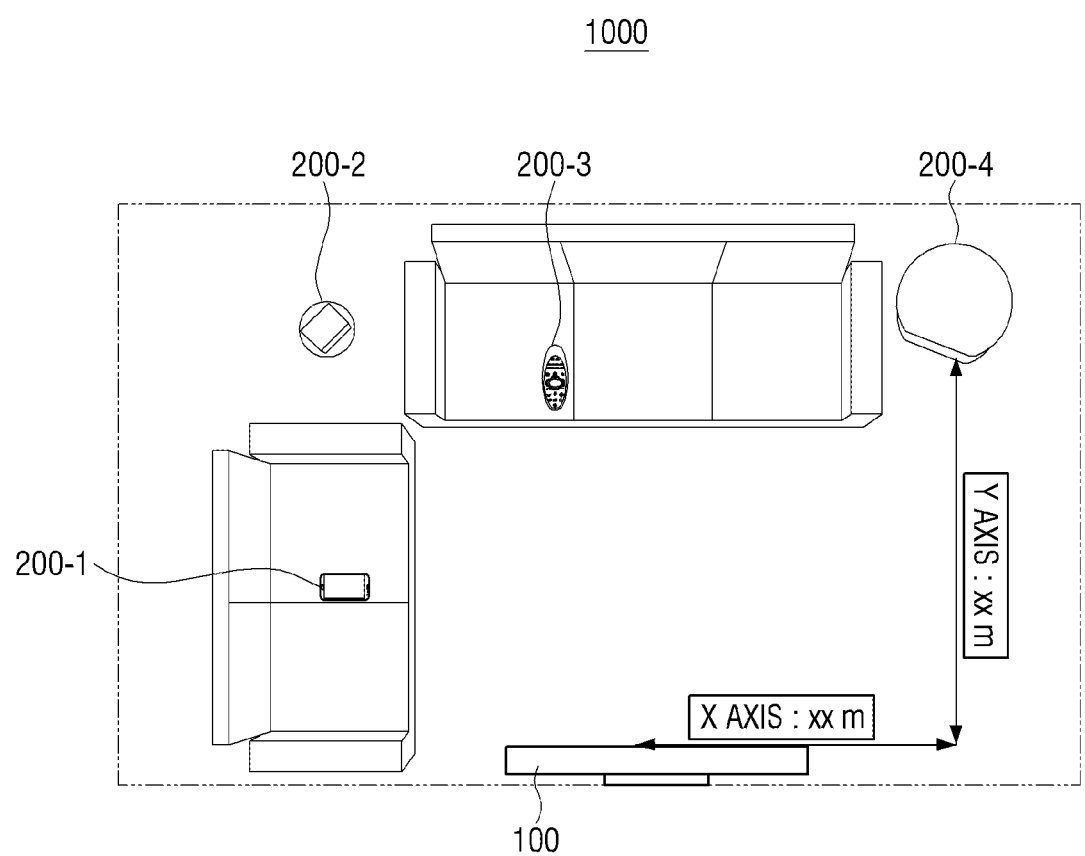
FIG. 1 is a schematic diagram illustrating a configuration of a home system according to an example embodiment.

FIG. 1 is a schematic diagram illustrating a configuration of a home system according to an example embodiment.

According to FIG. 1, a home system 1000 according to an example embodiment may be implemented as a main electronic device 100 and a plurality of peripheral devices 200-1, 200-2, 200-3 and 200-4.

The electronic device 100 may be implemented as a device which has at least two speakers which output different audio. For example, the electronic device 100 may be implemented as a smart TV as illustrated in FIG. 1. However, the embodiment is not limited thereto, and the electronic device 100 may be implemented as any device including at least two speakers.

The plurality of peripheral devices 200-1, 200-2, 200-3 and 200-4 may be implemented as a device including a microphone which can receive audio output from the electronic device 100. For example, the plurality of peripheral devices 200-1, 200-2, 200-3 and 200-4 may be implemented as the electronic and electric products which are used in a certain space such as home or an office. The plurality of peripheral devices 200-1, 200-2, 200-3 and 200-4 may be implemented to be able to perform bidirectional communication with the electronic device 100. According to an example embodiment, the plurality of peripheral devices 200-1, 200-2, 200-3 and 200-4 may perform unidirectional communication with the electronic device 100, and it will be described later.

The home system 100 may also be implemented as a home network system which connects the plurality of peripheral devices 200-1, 200-2, 200-3 and 200-4 as one system and performs bidirectional communication between the peripheral devices, but is not limited thereto. The home system 100 may be implemented by any system in which a plurality of devices can be connected via a network and be controlled.

The electronic device 100 may communicate with a gateway device, a network server, a controller, etc., or may be implemented to include a function of at least one of gateway device, a network server, a controller, etc. and to control overall operations of a plurality of devices in a network system.

Meanwhile, if the home system 1000 as illustrated in FIG. 1 is included, the electronic device 100 may be implemented as a smart TV including at least two speakers, and the plurality of peripheral devices 200-1, 200-2, 200-3 and 200-4 may be implemented as a smartphone 200-1 including a microphone, a room speaker 200-2, a remote controller 200-3 and an air conditioner 200-4, respectively, but are not limited thereto. The peripheral devices may be also implemented by various forms of devices such as a robotic vacuum cleaner, a heater, a refrigerator, a washing machine, an air purifier, a monitor, a DVD player, a digital camera, an electronic picture frame, a light, a blind, or the like.

According to an example embodiment, different audio may be output through two speakers provided in the electronic device 100, and the position of a peripheral device may be identified through the process of receiving the audio from the peripheral device, and various services may be provided based on the identified position. Hereinafter, various example embodiments will be described with reference to the drawings.

Figure 2:
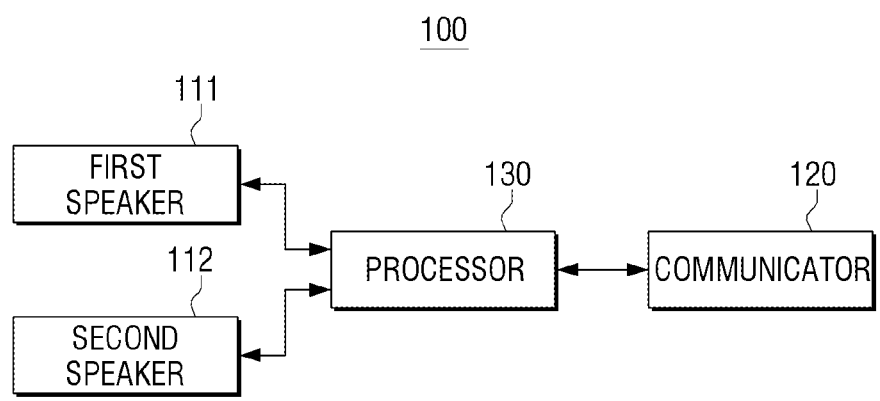
FIG. 2 is a block diagram illustrating a configuration of an electronic device according to an example embodiment.

FIG. 2 is a block diagram illustrating a configuration of an electronic device according to an example embodiment.

According to FIG. 2, the electronic device 100 may include a first speaker 111, a second speaker 112, a communicator 120 and a processor 130.

The first speaker 111 may output a first audio signal.

The second speaker 112 may output a second audio signal which is different from the first audio signal. One of a frequency, a band, a pitch, a tinebre and a duration of the second audio signal may be different from those of the first audio signal. For example, the first audio signal output from the first speaker 111 may have the frequency of 10 Hz, and the second audio signal output from the second speaker 112 may have the frequency of 20 Hz.

The first speaker 111 and the second speaker 112 may be configured to convert an electric pulse into a sound wave, and be implemented as an electro-dynamic type, that is, a dynamic type, which is classified according to a principle and a method of converting an electric signal into a sound wave. However, the embodiments of the first speaker 111 and the second speaker 112 are not limited thereto, and the first speaker 111 and the second speaker 112 may be implemented as an electrostatic type, a dielectric type, a magnetostrictive type, or the like.

The first speaker 111 and the second speaker 112 may be implemented by a multi-way system in which a range of the reproduction band is divided into low, middle, and high ranges, and each of the divided ranges are allocated to an appropriate speaker. For example, in the case of a three-way system in which the reproduction band is shared between three types of speakers, the first speaker 111 and the second speaker 112 may be implemented to include a tweeter which reproduces a high frequency acoustic signal, a midrange speaker which reproduces an intermediate frequency acoustic signal, a woofer which reproduces a low frequency acoustic signal, and the like. In this case, the first speaker 111 and the second speaker 112 may be implemented as two speakers among the three speakers.

The first speaker 111 and the second speaker 112 may be configured to be spaced from each other with equal to or more than a predetermined distance. For example, if the electronic device 100 is implemented as a digital TV, the first speaker 111 and the second speaker 112 may be embedded in the right end and in the left end, respectively, but are not limited thereto. For example, the first speaker 111 and the second speaker 112 may also be implemented by separate speakers which are attached to the electronic device 100 on the condition that it is possible to know the attached positions.

The communicator 120 may communicate with the peripheral device 200 including a microphone. The communicator 120 may communicate with the peripheral device 200 by various communication methods such as Bluetooth, Wi-Fi, ZigBee, IR (Infrared), serial interface, universal serial bus (USB), near field communicator (NFC), or the like.

For example, when a predetermined event occurs, the communicator 120 may communicate with the external speaker 200 by a predefined communication method, and the electronic device 100 may enter the interlocked state. The interlocking may refer to every state in which communication is available, such as the operations of initializing communication, forming a network, device-pairing, etc. between the electronic device 100 and the peripheral device 200. For example, the device identification information such as a pin code of the peripheral device 200 may be provided to the electronic device 100, and the procedure of pairing between the two devices may be performed accordingly. For example, when a predetermined event occurs in the electronic device 100 and in the peripheral device 200, the peripheral device 200 may search the electronic device 100 using the digital living network alliance (DLNA) technique, and the electronic device 100 and the peripheral device 200 may be paired and enter the interlocked state.

The communicator 120 may transmit the device identification information such as a pin code which is based on a sound wave to the peripheral device 200, and perform the pairing. When the peripheral device 200 receives the pin code, the pairing may be performed by the pin being automatically input.

The pairing with the peripheral device 200 may be performed using a Bluetooth communication, etc., and the wireless network connection information, such as Wi-Fi, may be transmitted to the paired peripheral device 200 and the peripheral device 200 may be connected via the wireless network. Once the peripheral device 200 is connected via the wireless network, the communicator 120 may receive the information related to the product type and the position analyzed in the peripheral device 200 from the peripheral device 200.

The processor may control overall operations of the electronic device 100.

The processor 130 may receive through the communicator 120 the information of the time at which the first audio signal and the second audio signal are received from the peripheral device 200 which receives by a microphone the first audio signal and the second audio signal output through the first speaker 111 and the second speaker 112. The processor 130 may determine the distance to and the direction of the peripheral device 200 with reference to the electronic device 100 based on the received information.

The received information may be the file in which the state that the first audio signal and the second audio signal are sequentially received through the microphone provided in the peripheral device 200 is recorded (or recorded in sound or captured), or may include the information of the time at which the first audio signal and the second audio signal are sequentially received through the microphone provided in the peripheral device 200. In other words, the peripheral device 200 may record the state that the first audio signal and the second audio signal are sequentially received through the microphone provided in the peripheral device 200, and the peripheral device 200 may transmit the recorded information as it is to the electronic device 100, or may analyze the recorded information, obtain the information of the time at which the first audio signal and the second audio signal are sequentially received, and transmit the obtained time information to the electronic device 100.

When a reference signal (or a trigger signal) is received from the peripheral device 200, the processor 130 may output the first audio signal and the second audio signal simultaneously. In this case, the peripheral device 200 may transmit the reference signal to the electronic device 100, and operate in a recording mode. In other words, the peripheral device may start recording the audio signals. The reference signal may be received via radio frequency (RF) communication such as Bluetooth (BT), but is not limited thereto.

The processor 130 may calculate the difference between the time point at which the reference signal is received and the time points at which the first audio signal and the second audio signal are output.

The processor 130 may determine the distance to and the direction of the peripheral device 200 with reference to the position of the electronic device 100 based on the time information according to such operations as above.

The processor 130 may determine the distance to and the direction of the peripheral device 200 based on first time information and second time information which are obtained from the received information and which indicate the time at which the first audio signal is received and the second audio signal is received in the peripheral device 200, respectively, and third time information on a time difference between the time (or the time at which the reference signal is received in the electronic device 100) at which the reference signal is output from the peripheral device 200 and the time at which the first audio signal and the second audio signal are output.

For example, the processor 130 may calculate the right distance by multiplying a time difference between the first time information and the third time information by a velocity value of an audio signal. By the same method, the processor 130 may also calculate the left distance by multiplying a time difference between the second time information and the third time information by a velocity value of an audio signal. The processor 130 may determine the distance to and the direction of the peripheral device 200 based on the calculated right and left distances and the distance between the first speaker 111 and the second speaker 112.

However, the embodiment is not limited to the above example, but according to another example embodiment, the processor 130 may output the first audio signal and the second audio signal simultaneously, and determine the distance based on the first time information and the second time information which are obtained from the received information and which indicate the time at which the first audio signal is received and the time at which the second audio signal are received in the peripheral device 200, respectively, and the third time information of the time at which an event occurs. For example, if the time is synchronized between the electronic device 100 and the peripheral device 200, the electronic device 100 may transmit the signal requesting an audio signal recording to the peripheral device 200 and output an audio signal after a predetermined time, and determine the distance based on the time information received from the peripheral device 200. For example, if the time at which the electronic device 100 outputs an audio signal is A, and the time at which the peripheral device 200 receives the first audio signal and the time at which the peripheral device 200 receives the second audio signal are B and C, respectively, the right distance and the left distance may be calculated by multiplying B−A (B minus A) by a velocity value of the audio signal and multiplying C−A (C minus A) by a velocity value of the audio signal, respectively.

The processor 130 may provide various services based on the distance to and the direction of the external device 200 which are obtained according to the various example embodiments as above. For example, if the peripheral device 200 is implemented as a remote controller, the processor 130 may provide the services such as searching for a remote controller and determining the oriented direction and the oriented position of a remote controller according to an absolute coordinate method, and if the peripheral device 200 is implemented as a home theater speaker, the processor 130 may provide the services such as an HTS (Home Theater System) easy setup service, a service of forming a network between IoT devices in a home network, various services through detection of the position of an electronic appliance (e.g., an air conditioner, a robotic vacuum cleaner).

For example, if the electronic device 100 is implemented as a TV and the peripheral device 200 is implemented as a pointing device, the processor 130 may convert the distance to and the direction of the peripheral device 200 into X and Y coordinates on the screen of the electronic device 100 by applying a signal processing algorithm to the distance and the direction. After that, the processor 130 may map the converted X and Y coordinates to the X and Y coordinates of a pointing object on the UI screen of the display device 100 and designate the coordinates of the pointing object.

The position of a pointing object may be designated using the designated coordinates as described above. In this case, the position to which the peripheral device 200 is oriented may be determined on the screen based on the assumption that the peripheral device 200 is oriented to the screen at its position. Accordingly, the pointing object may be displayed by an absolute coordinate method according to a trigger signal.

Figure 3A:
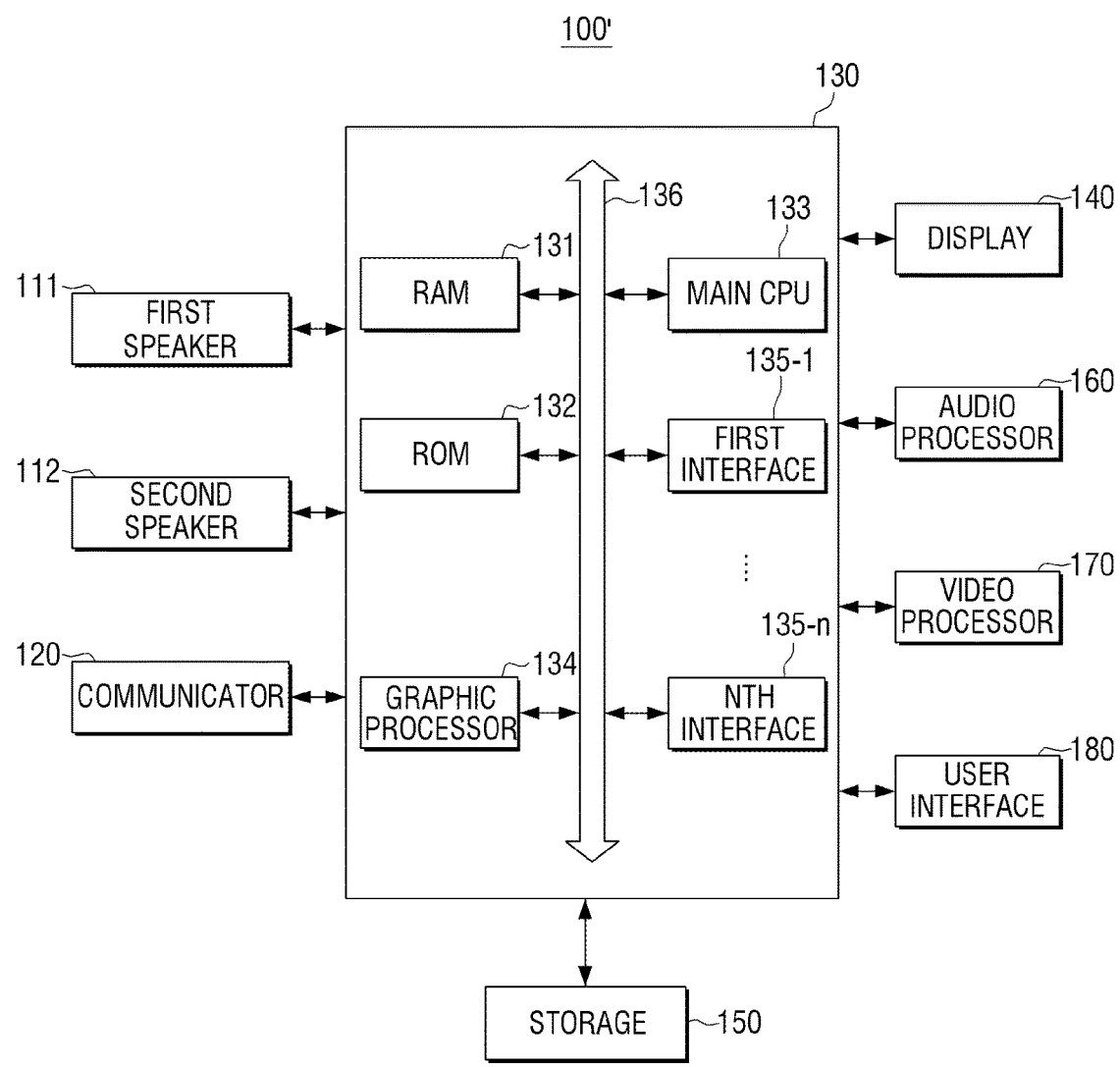
FIGS. 3A and 3B are block diagrams illustrating a detail configuration of the electronic device illustrated in FIG. 2.
Figure 3B:
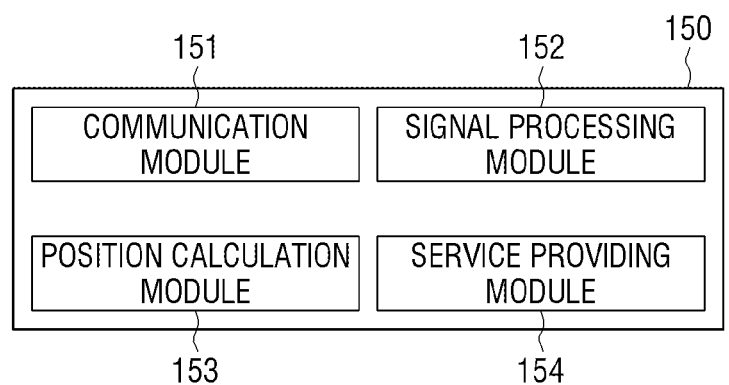

FIGS. 3A and 3B are block diagrams illustrating a detail configuration of the electronic device illustrated in FIG. 2.

FIG. 3A is a block diagram illustrating a specific configuration of the electronic device illustrated in FIG. 2.

According to FIG. 3A, the electronic device 100' may include the first speaker 111, the second speaker 112, the communicator 120, the processor 130, a display 140, a storage 150, an audio processor 160, a video processor 170 and a user interface 180. The detailed description for the elements which are overlapped with the elements illustrated in FIG. 2 will not be repeated.

The processor 130 may control the overall operations of the electronic device 100'.

The processor 130 may include a RAM 131, a ROM 132, a main CPU 133, a graphic processor 134, a first to nth interfaces 135-1 to 135-n and a bus 136.

The RAM 131, the ROM 132, the main CPU 133, the graphic processor 134, and the first to nth interfaces 135-1 to 135-n may be connected to one another via the bus 136.

The first to nth interfaces 135-1 to 135-n may be connected with the elements described above. One of the interfaces may be a network interface which is connected with an external device via a network.

The main CPU 133 may access to the storage 150, and perform booting using an operating system (O/S) stored in the storage 150, and perform various operations using programs, contents, data, etc. stored in the storage 150.

In the ROM 132, a command set for booting a system, etc. may be stored. Once a turn-on command is input and power is supplied, the main CPU 133 may copy the O/S stored in the storage 150 to the RAM 131 according to a stored command, and execute the O/S and boot a system. Once the booting is completed, the main CPU 133 may copy various application programs stored in the storage 150 to the RAM 131, and execute the application programs copied to the RAM 131 and perform various operations.

The graphic processor 134 may generate a screen including various objects such as an icon, an image, text, etc., which is, for example, a screen including a pointing object, using a computation unit (not illustrated) and a rendering unit (not illustrated). The computation unit (not illustrated) may calculate the attribute values such as coordinate values, a shape, a size, a size, color, etc. with which each object is displayed according to a layout of a screen based on a received control command. The rendering unit (not illustrated) may generate screens of various layouts which include an object based on the attribute values calculated by the computation unit (not illustrated). The screen generated in the rendering unit (not illustrated) may be displayed in a user interface area of the display 140.

The operation of the processor 130 as described above may also be performed by a program stored in the storage 150 as illustrated in FIG. 3B.

The storage 150 may store various data such as an operating system (O/S) software module for driving the electronic device 100', and a variety of multimedia content. As illustrated in FIG. 3B, in the storage 150, a communication module 151, a signal processing module 152, and a position calculation module 153, and a service providing module 154, which are for providing a function according to an example embodiment, may be stored.

The processor 130 may receive a signal from the peripheral device 200 using the communication module 151, and transmit the signal to the peripheral device 200.

For example, the processor 130 may receive a reference signal from the peripheral device 200 using the communication module 130, and transmit to the peripheral device 200 a signal including the information of the time at which audio signals are output through the first speaker 111 and the second speaker 112.

The processor 130 may process a signal received from the peripheral device 200 or process a signal to be transmitted to the peripheral device 200 using the signal processing module 152.

For example, when the file in which the reception state of the first audio signal and the second audio signal is recorded is received from the peripheral device 200, the processor 130 may process the file to the state that the position calculation module 153 can analyze using the signal processing module 152.

The storage 150 may store the information on the target position corresponding to the peripheral device 200. The target position may refer to the most optimal position where the peripheral device 200 should be positioned. The target position may be a relative position with reference to the electronic device 100, and may be set in a certain direction and with a certain distance from the electronic device 100 and be stored. The processor 130 may determine whether the peripheral device 200 is positioned at the target position using the information on the target position stored in the storage 150, and if the position of the peripheral device 200 is not consistent with the target position, the processor 130 may provide the information of the movement of the peripheral device 200 for arranging the peripheral device 200 at the target position.

The processor 130 may receive the position information of the peripheral device 200 from the peripheral device 200 through the communicator 120, and determine whether the peripheral device 200 is positioned at the target position according to the received position information. If it is determined that the peripheral device 200 is not positioned at the target position, the processor 130 may provide the movement information of the peripheral device 200 for positioning the peripheral device 200 at the target position.

The movement information may include the information on the current position of the peripheral device 200 and the information on the pre-stored target position at which the peripheral device 200 should be positioned. The movement information may also include the information on the direction and the distance to the target position from the peripheral device 200.

The processor 130 may calculate the position of the external device 200, which is the distance to and the direction of the external device 200, using the position calculation module 153 based on the value processed by the signal processing module 152.

The display 140 may provide various content screens. The content screen may include an application execution screen which includes various contents such as an image, a video, text, music, etc. and a graphic user interface screen (GUI), or the like. The electronic device 100' including the display 140 may be referred to as a display device.

The processor 130 may display through the display 140 a UI screen indicating a relative position of the peripheral device 200 with reference to the electronic device 100 based on the calculated distance to and direction of the peripheral device 200. The UI screen may be implemented in various forms such as an image, a video, text, or the like. Meanwhile, the display 140 may be implemented as a liquid crystal display panel (LCD), an organic light emitting diodes (OLED), etc., but is not limited thereto. The display 140 may also be implemented as a flexible display, a transparent display, or the like.

For example, the processor 130 may display a 2D or 3D space layout including the devices connected to a home network, and provide the position of the peripheral device 200 in the space layout. Accordingly, the space layout may include the information on at least one of home devices connected to a home network, and the information may include the information for identifying a home device in the form of text (e.g., a name of a home device) or an image (e.g., an actual image or an exterior image of a home device, or an icon). The space layout may be made based on the information of the position and the device type of each home device. For example, a virtual space layout may be created based on the position information and the device type of each home device connected to a home network, and the space layout may be updated based on the position information that is input whenever an existing home device is disconnected from the home network or a new home device is connected.

The display 140 may be implemented as various types of displays such as a liquid crystal display panel (LCD), an organic light emitting diodes (OLED), a liquid crystal on silicon (LCoS), a digital light processing (DLP), or the like. The display 140 may also include a driving circuit which can be implemented as a-si TFT, low temperature poly silicon (LTPS), TFT, organic TFT (OTFT), a backlight unit, or the like.

The electronic device 100' may further include an audio processor 160 which processes audio data, a video processor 170 which processes video data, and a user interface 180 including a camera which photographs a still image or films a video and a microphone which receives a user voice or other sounds and converts the sounds into audio data, etc. For example, the processor 130 may control the audio processor 160 to process the first audio signal and the second audio signal which are output through the first speaker 111 and the second speaker 112.

Figure 4A:
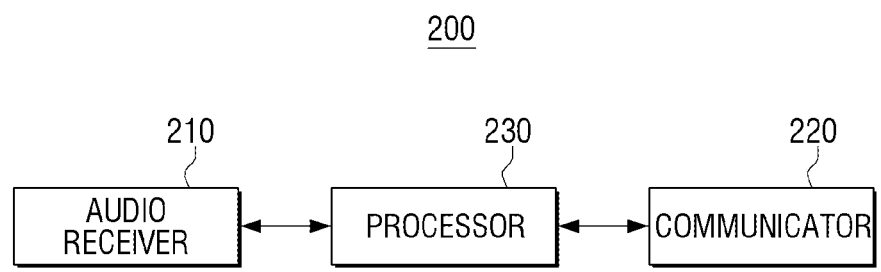
FIGS. 4A and 4B are block diagrams illustrating a configuration of a peripheral device according to an example embodiment.
Figure 4B:
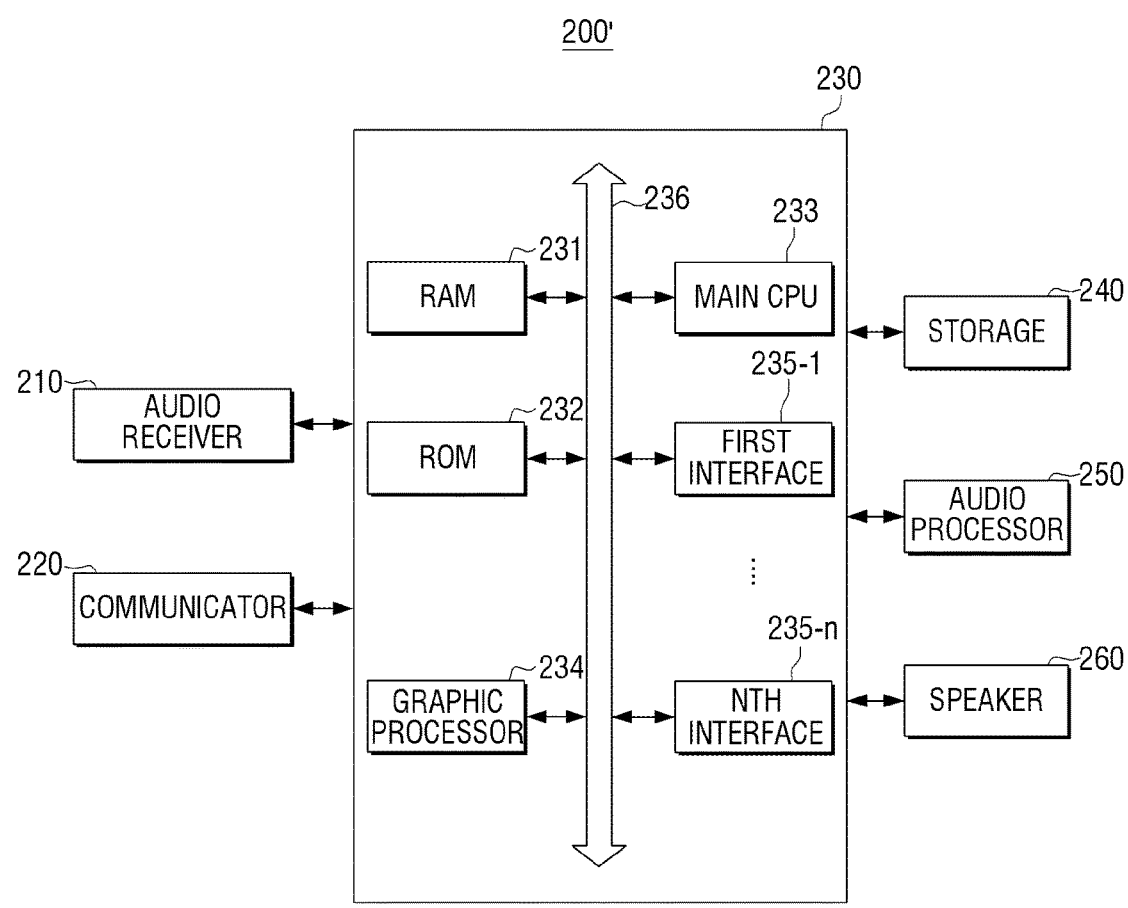

FIGS. 4A and 4B are block diagrams illustrating a configuration of a peripheral device according to an example embodiment.

According to FIG. 4A, the peripheral device 200 may include an audio receiver 210, a communicator 220 and a processor 230.

The audio receiver 210 may be implemented to include at least one microphone which receives the first audio signal and the second audio signal output from the electronic device 100.

The communicator 220 may communicate with the electronic device 100, and the specific configuration of the communicator 220 may be similar with the configuration of the communicator 120, and thus, the communicator 220 will not be described in detail.

According to an example embodiment, when the first audio signal and the second audio signal different from the first audio signal, which are output from each of the plurality of speakers provided in the electronic device 100, are received through the audio receiver 210 sequentially, the processor 230 may record the received audio signals and transmit the recording information to the electronic device 100. In this case, the processor 230 may transmit to the electronic device 100 a trigger signal which allows the electronic device 100 to output an audio signal according to a predetermined event (e.g., a predetermined button input). In other words, the processor 230 may perform an operation corresponding to the operation of the electronic device 100 illustrated in FIG. 2.

However, according to another example embodiment, the peripheral device 200 may determine its distance and direction by itself with reference to the position of the electronic device 100, and provide the determined information to the electronic device 100 if necessary.

According to another example embodiment, when the first audio signal and the second audio signal different from the first audio signal, which are output from each of the plurality of speakers provided in the electronic device 100, are received through the audio receiver 210 sequentially, the processor 230 may record the received audio signals, obtains the time at which the first audio signal is received and the time at which the second audio signal is received, and determine the distance to and the direction of the peripheral device 200 with reference to the electronic device 100 based on the obtained times. In this case, the processor 230 may transmit to the electronic device 100 a trigger signal which allows the electronic device 100 to output an audio signal.

For example, the processor 230 may determine the distance to and the direction of the peripheral device 200 based on the first time information and the second time information which are obtained from the recorded file and which indicate the time at which the peripheral device receives the first audio signal and the time at which the peripheral device receives the second audio signal, respectively, and the third time information which indicates the time difference between the time at which a reference signal is received and the time at which the first audio signal and the second audio signal are output. In this case, the third time information may be obtained from the electronic device 100, or obtained from the processor 230 after the processor 230 calculates the time difference between the time at which the peripheral device 200 receives the first audio signal and the time at which the peripheral device 200 receives the second audio signal.

For example, the processor 230 may calculate the right distance by multiplying the time difference between the first time information and the third time information by a velocity value of an audio signal. By the same method, the processor may calculate the left distance by multiplying the time difference between the second time information and the third time information by a velocity value of an audio signal. The processor 230 may determine the distance to and the direction of the electronic device 100 based on the calculated right and left distances.

However, the embodiment is not limited to the above example, and according to another example embodiment, the processor 130 of the electronic device 100 may output the first audio signal and the second audio signal simultaneously according to a predetermined event after transmitting a signal requesting an audio signal recording to the external speaker 200.

FIG. 4B is a block diagram illustrating a specific configuration of the peripheral device illustrated in FIG. 4A. According to FIG. 4B, the peripheral device 200' may include an audio receiver 210, a communicator 220, a processor 230, a storage 240, an audio processor 250 and a speaker 260. The detailed description for the elements which are overlapped with the elements illustrated in FIG. 4A will not be repeated.

The operations of the processor 230 may be performed by the programs stored in the storage 240.

In the storage 240, a signal processing algorithm for processing a received signal may be stored. Also, according to different example embodiments, various data such as operating system (O/S) software for driving the electronic device 100, a signal processing algorithm for performing the calculations relating to various detection signals, etc. may be stored in the storage 240.

The detail configuration of the processor 230 is similar to the configuration of the processor 130 of the electronic device 100' (FIG. 3A) and thus, the processor 230 will not be described in detail.

If the peripheral device 200 is implemented as a pointing device according to an example embodiment, various sensors (e.g., an acceleration sensor, a geomagnetic sensor, a gyro sensor, etc.) for sensing the movement of the peripheral device 200 may be further included.

In this case, the processor 230 may perform various calculations according to diverse sensing signals. For example, the processor 230 may perform a pre-processing to a sensor value received from various sensors and transmit the sensor values to the electronic device 100. For instance, the processor 230 may perform a pre-processing such as converting the sensor value converted into a digital value into an actual physical amount, adjusting each separate axes of the acceleration sensor, the geomagnetic sensor and the gyro sensor to one defined axis, removing electrical noises of the sensors and unintended high frequency movement through a low bandwidth pass filtering, and the like. However, in some cases, the calculations may be performed according to the algorithm for processing a detected signal, and the calculated value may be transmitted to the electronic device 100.

If the peripheral device 200 is implemented as a pointing device, a power button for receiving a user command for powering on and off, a centering button for displaying a pointing object on a screen of the electronic device 100 and setting a reference position, etc. may be further included. For example, when the peripheral device 200 is turned on, the peripheral device 200 may perform pairing with the electronic device 100. After the pairing is completed, when a user presses the centering button (not illustrated), a pointing object may be displayed on the center of the screen of the display of the electronic device 100.

Figure 5:
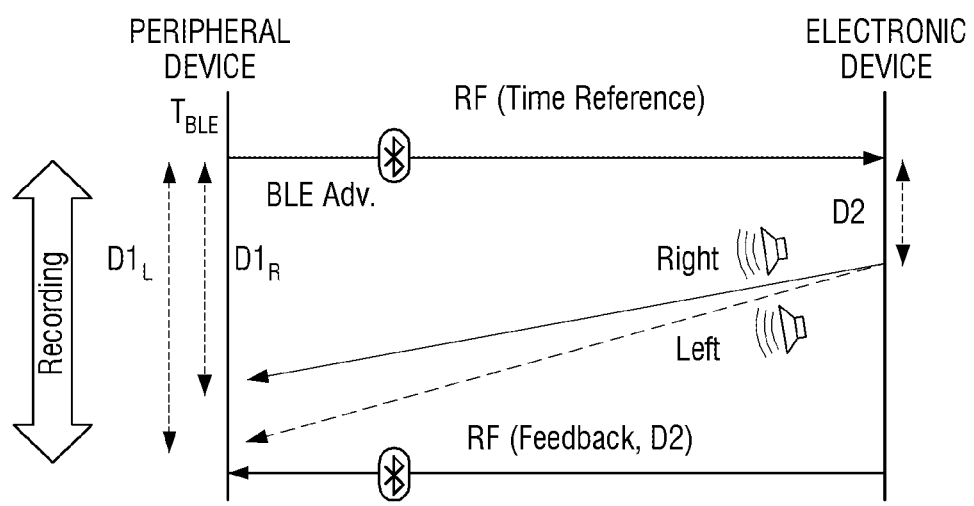
FIGS. 5 to 7 are diagrams illustrating a method for determining a distance to and a direction of a peripheral device according to various example embodiments.
Figure 6:
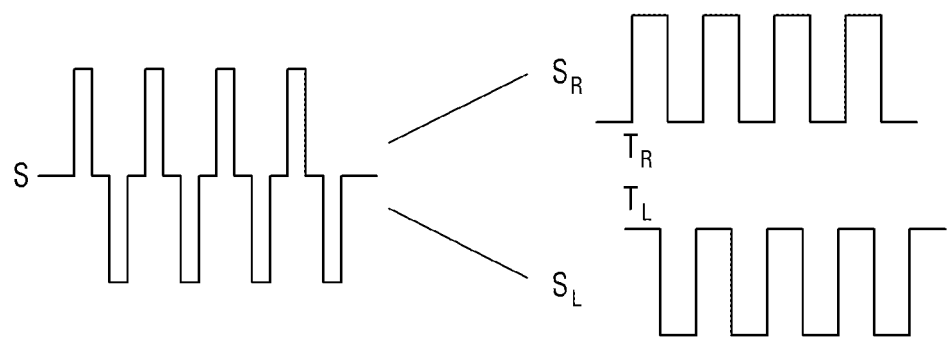
Figure 7:
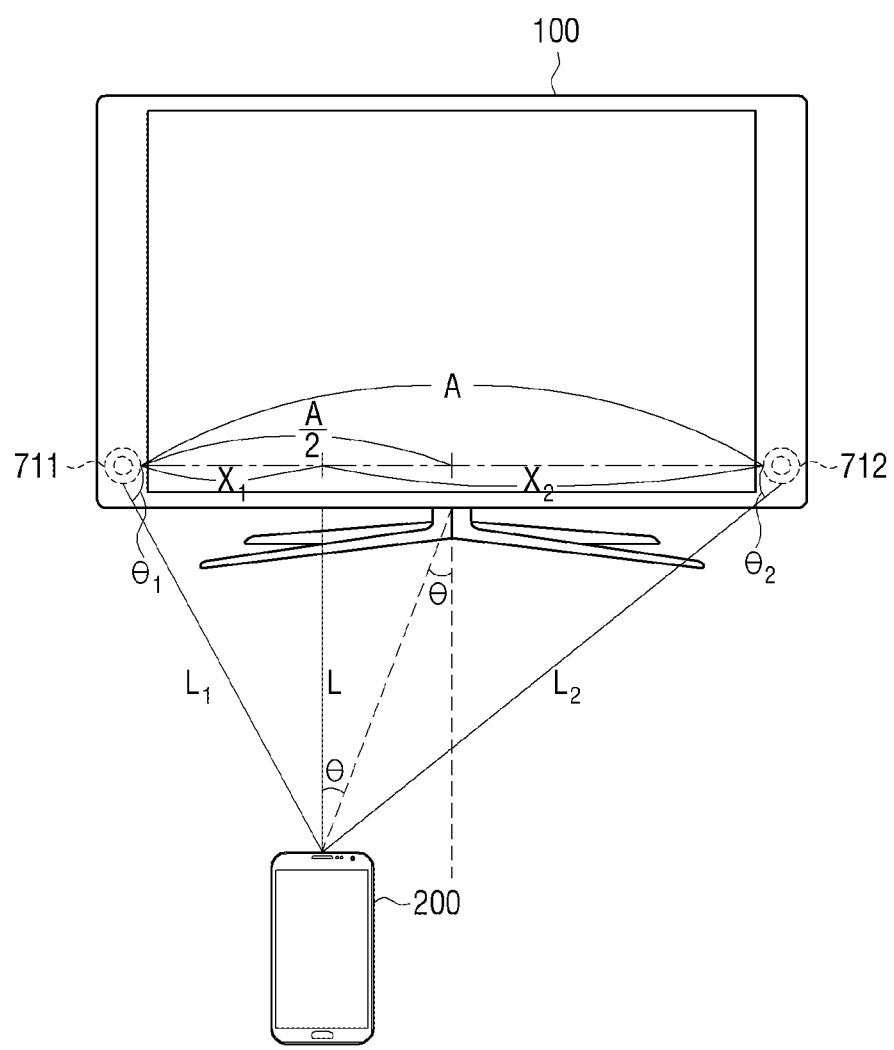

FIGS. 5, 6 and 7 are diagrams illustrating a method for determining a distance to and a direction of a peripheral device according to various example embodiments.

The example embodiment in which the peripheral device 200 determines the distance and the direction will be described with reference to FIG. 5.

According to FIG. 5, the peripheral device 200 may output a reference signal, which is a time reference signal, to the electronic device 100 and operate in a recording mode.

In this case, the electronic device 100 which receives the reference signal may output a first audio signal and a second audio signal different from the first audio signal through a right and left speakers, and transmit to the peripheral device 200 the time information of the time difference D2 between the time at which the reference signal is received and the time at which the audio signal is output.

In this case, as illustrated in FIG. 6, the peripheral device 200 may obtain first audio signal $S_R$ and second audio signal $S_L$ from received audio signal S, and obtain the information of time points $T_R$ and $T_L$ at which each audio signals are received, respectively.

In this case, the peripheral device 200 may calculate the distance to and the direction of the peripheral device 200 with reference to the electronic device 100 based on the value calculated by subtracting D2 from the time difference ($D1_R$) between the time at which the reference signal is output and the time at which the first audio signal is received through a microphone, that is, $D1_R$–D2 ($D1_R$ minus D2), and the value calculated by subtracting D2 from the time difference ($D1_L$) between the time at which the reference signal is output and the time at which the second audio signal is received through a microphone, that is, $D1_L$–D2 ($D1_L$ minus D2).

For example, referring to FIG. 7, the processor 230 may calculate distance L1 that is the distance to the left speaker

711 by multiplying $D1_R$–$D2$ by velocity value Vs (e.g., 340 m/s) that is the velocity value of the audio signal, and calculate distance L2 that is the distance to the right speaker 712 by multiplying $D1_L$–$D2$ by the velocity value Vs. In this case, as distance A that is the distance between the left speaker 711 and the right speaker 712 is already calculated, vertical distance L and direction θ, which are the vertical distance to and the direction of the electronic device 100, may be calculated based on the distance A.

Figure 8A:
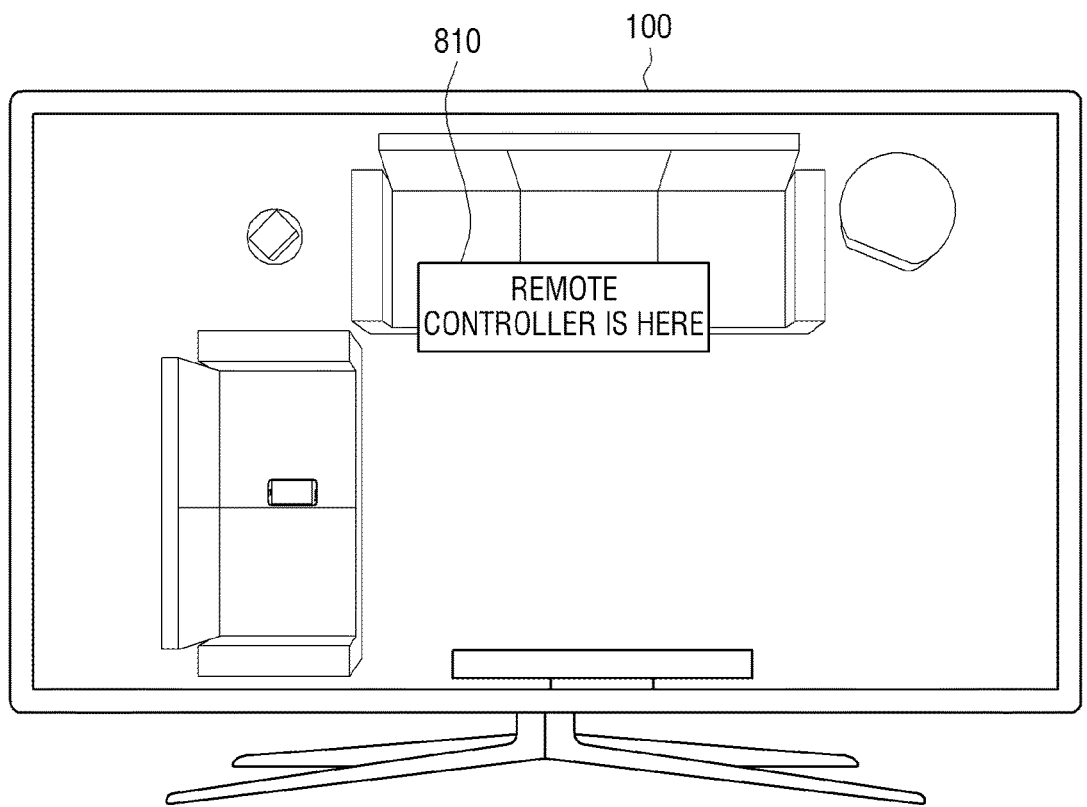
FIGS. 8A and 8B are diagrams illustrating a service provided according to various example embodiments.
Figure 8B:
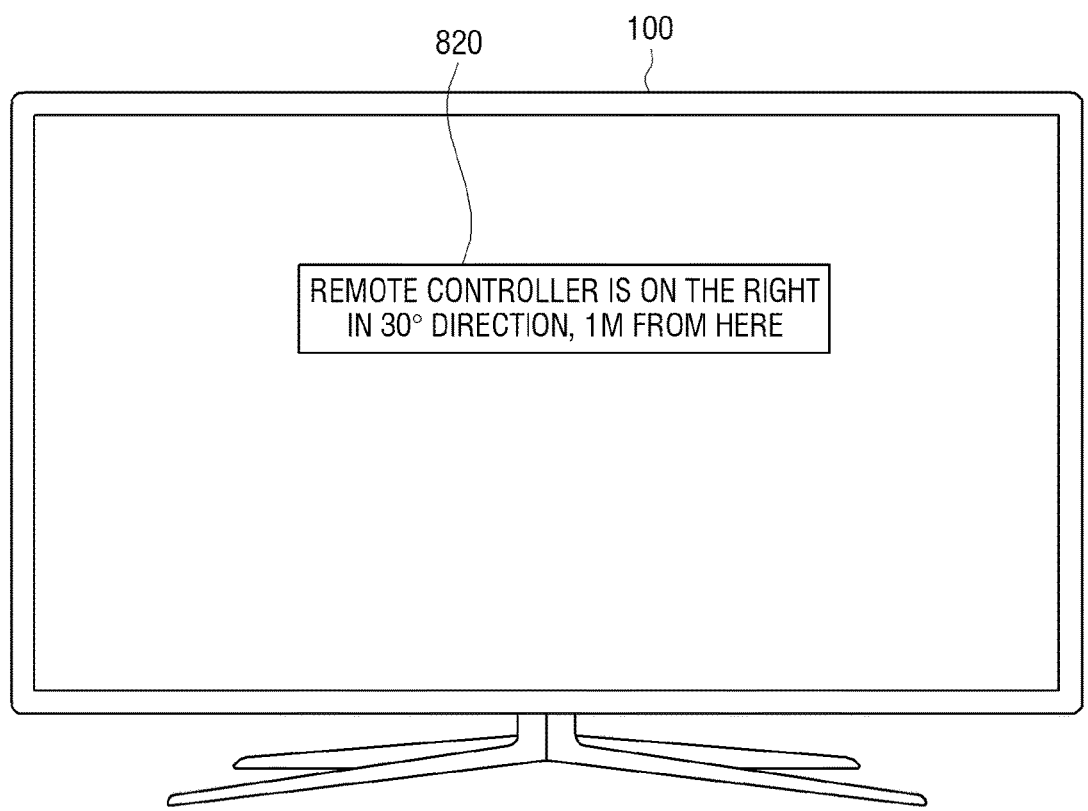

FIGS. 8A and 8B are diagrams illustrating a service provided according to various example embodiments.

According to an example embodiment, if a user wants to know the position of a movable peripheral device, which is, for example, the position of a remote controller, the user can select the menu for locating a remote controller and be provided with the corresponding service.

When the distance to and the direction of the remote controller, which is the position of the remote controller, is determined by the aforementioned method, the electronic device 100 may provide the information on the position of the remote controller as a UI screen of various methods as illustrated in FIGS. 8A and 8B. For example, a UI 810 which guides the position of the remote controller on a virtual space layout may be provided as illustrated in FIG. 8A, or a UI 820 which provides the approximate position of the remote controller in numerical values with reference to the electronic device 100 may be provided as illustrated in FIG. 8B.

FIG. 9 is a sequence diagram illustrating operations between an electronic device and a peripheral device according to an example embodiment.

According to FIG. 9, the peripheral device 200 may transmit to the electronic device 100 a reference signal for an audio output (S910). In this case, the peripheral device 200 may enter a recording mode (S920).

When the electronic device 100 receives the reference signal, different audio signals may be output through a plurality of speakers (S930).

The peripheral device 200 may record the audio signals received through a microphone in the recording mode (S940).

The peripheral device 200 may transmit the information in which the sequentially received different audio signals are recorded to the electronic device 100 (S950).

The electronic device 100 may determine the position of the peripheral device 200 by analyzing the recording information received from the peripheral device 200 (S960).

As the detail operations of each operation has already been described, the detailed description therefor will not be repeated.

FIG. 10 is a sequence diagram illustrating operations between an electronic device and a peripheral device according to another example embodiment.

According to FIG. 10, the peripheral device 200 may transmit to the electronic device 100 a reference signal for an audio output (S1010). The peripheral device 200 may enter a recording mode (S1020).

When the electronic device 100 receives a reference signal, different audio signals may be output through a plurality of speakers (S1030).

The peripheral device 200 may record the audio signals received through a microphone in the recording mode (S1040).

The electronic device 100 may transmit to the electronic device 100 the time information of the time difference between the time at which the reference signal is received and the time at which the audio signal is output (S1050).

The peripheral device 200 may determine the position of the peripheral device 200 by analyzing the time information received from the electronic device 100 and the recording information in which the audio signals are recorded (S1060).

As the detail operations of each operation has already been described, the detailed description therefor will not be repeated.

Figure 11:
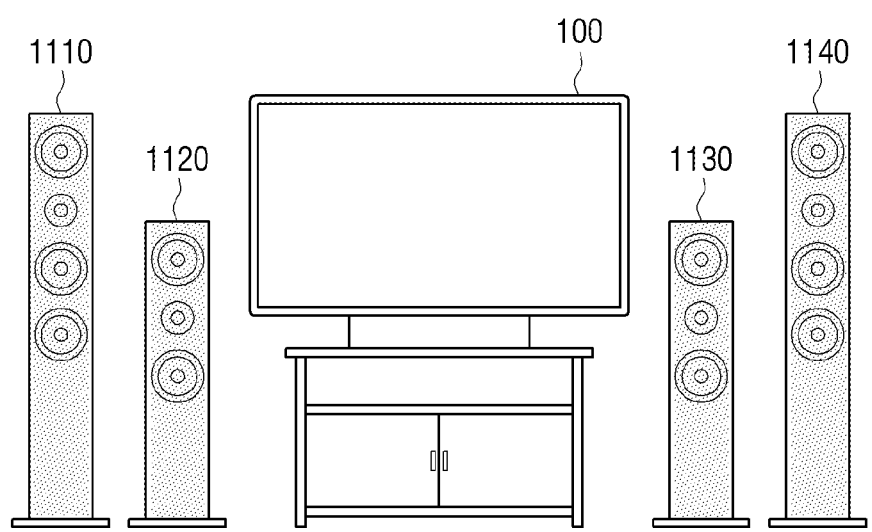
FIGS. 11 and 12 are block diagrams briefly illustrating a configuration of an audio output system including a display device and an external speaker according to an example embodiment.
Figure 12:
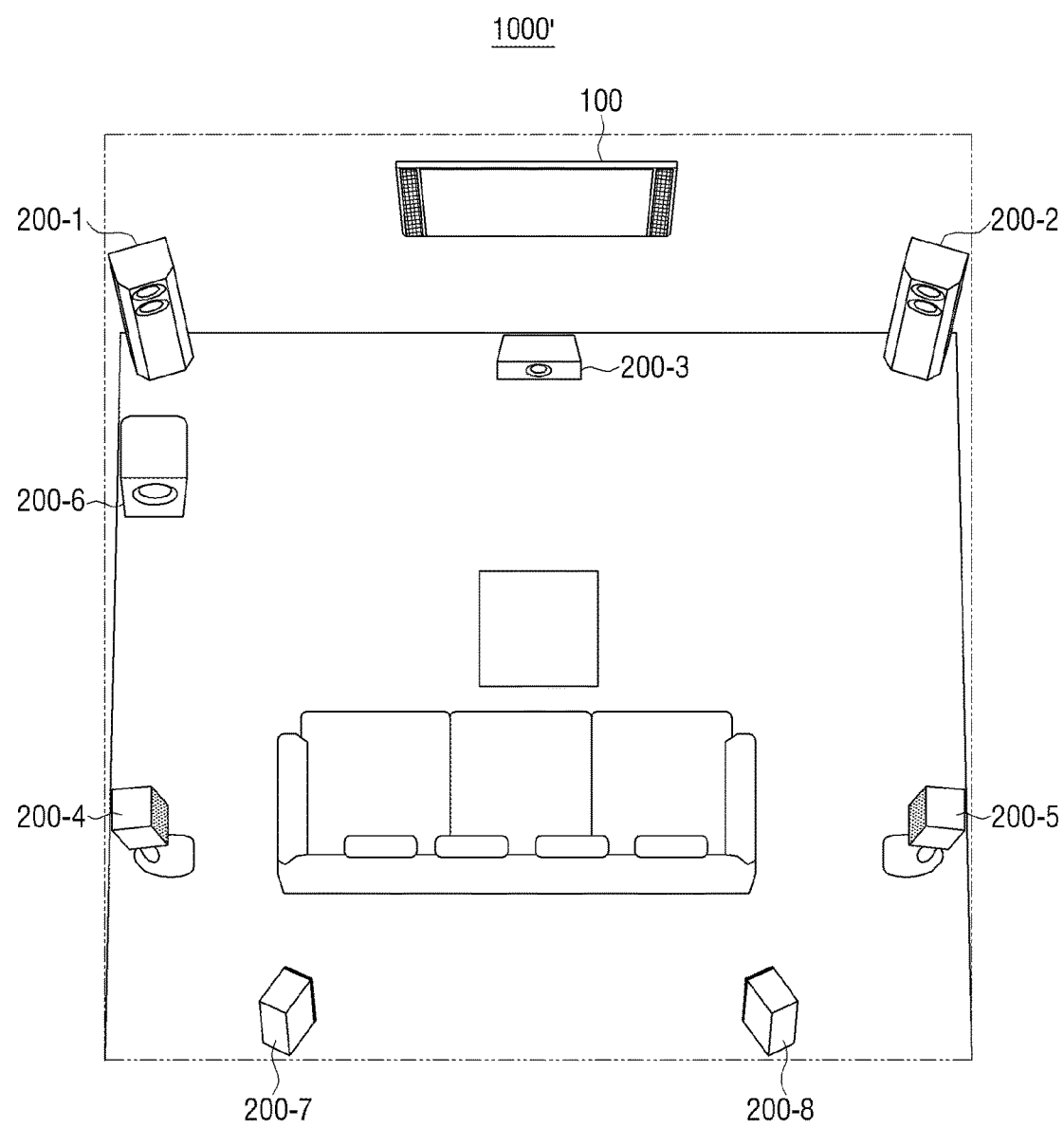

FIGS. 11 and 12 are block diagrams illustrating a configuration of an audio output system including a display device and an external speaker according to an example embodiment.

FIG. 11 is a diagram illustrating the method for providing an HTS easy setup service for setting the speakers configuring the audio output system 1000' according to an example embodiment. As illustrated in FIG. 11, it is assumed that audio output system 1000' is configured by arranging the four speakers 1110, 1120, 1130 and 1140 on the right and left with reference to the electronic device 100. In the example embodiment, it is assumed that the electronic device 100 is implemented as a display device, and the peripheral device 200 is implemented as a plurality of speakers.

For example, it is assumed that a user connects the four speakers 1110, 1120, 1130 and 1140 to configure the audio output system 1000'.

The display device 100 may determine whether the connection is properly set by measuring the distance to and the direction of each speaker, and provide a feedback service accordingly. For example, if the leftmost speaker 1110 and the rightmost speaker 1140 are not connected properly, the electronic device 100 may measure the distance between the speakers and the direction of the speakers and provide the notification that the connection is not properly set to a user, or in some cases, the electronic device 100 may automatically change the connection setting. Meanwhile, in the above example embodiment, it may be assumed that a microphone is provided in each speaker, but the embodiment is not limited thereto. The technical concept of the present disclosure may be applied with only two speakers and one microphone, and thus, if a microphone is provided in the electronic device 100, the relative positions of the display device 100 and the four speakers 1110, 1120, 1130 and 1140 may be determined based on the audio signal output from each speaker and the position of each speaker.

FIG. 12 is a diagram illustrating an audio output system 1000' which is implemented as a home theater system in the living room in the home. The home theater system may be an audio output system which allows a user to experience the 3D feeling and the sense of realism using a high quality image and rich audio resources such as Dolby 5.1.

The home theater system includes a plurality of external speakers which are arranged on the side or on the back with reference to the hearing position, and the plurality of external speakers improves the 3D sound effect. The plurality of external speakers are usually configured with a front speaker L, a front speaker R, a center speaker, a rear speaker L, a rear speaker R and a subwoofer, and the basic purpose of the arrangement of the home theater system is to arrange the speakers at the optimal position in the home environment similarly to the arrangement of the speakers in the theater.

However, in the case of installing an existing home theater system, it would be difficult for an ordinary user to know each position of external speakers, and accordingly, the user may arrange each speaker referring to the manual. However, even though the user refers to the manual, there is the problem that it is difficult for the user to know exactly how far the speakers should be placed apart from each other and in what direction the speakers should be placed. Therefore, according to an example embodiment, it may be possible to guide an ordinary user to arrange the external speakers easily and conveniently without any help from an expert.

As illustrated in FIG. 12, the display device 100 may be configured to include at least two speakers and to output different audio signals, and may be implemented as a smart TV, or the like. However, the embodiment is not limited thereto, and the display device 100 may be implemented by any electronic device which includes at least two speakers.

The external speaker 200 may be implemented as a speaker including a microphone which can receive an audio signal output from the display device 100, and may be implemented to perform bidirectional communication with the display device 100. However, in some example embodiments, the external speaker 200 may perform unidirectional communication with the display device 100, and the example embodiment will be described later.

For example, the plurality of speakers 200 may be implemented as surround speakers configuring the home theater system 1000.' For instance, as illustrated in FIG. 1, the external speakers 200 may include a front speaker L 200-1, a front speaker R 200-2, a center speaker 200-3, a rear speaker L 200-4, a rear speaker R 200-5, a subwoofer 200-6, a back speaker L 200-7 and a back speaker R 200-8, or the like, and each external speaker 200-1 to 200-8 should be arranged in the proper position according to each function. For example, it may be desirable to arrange the front speaker L 200-1 and the front speaker R 200-2 on the front of a user and to arrange the rear speaker L 200-4 and the rear speaker R 200-5 on the side of a user, and it may be desirable to arrange the speakers to surround a user.

The home theater system 1000' according to an example embodiment may be implemented as a home network system which can connect the display device 100 and the plurality of speakers 200-1 to 200-8 as one system and perform bidirectional communication, but is not limited thereto. The home theater system 1000' may be implemented by any system in which a plurality of devices can be connected via a network and be control.

In the above example, the display device 100 may communicate with a gateway device, a network server, a controller, etc., or may be implemented to include a gateway device, a network server, a controller, etc. and control overall operations of a plurality of devices in the network system.

Meanwhile, when an ordinary user installs such a home theater system, it would be difficult for the user to know how far each of the external speakers 200-1 to 200-8 should be placed apart from each other and in what direction the speakers should be placed with reference to the display device 100, and also be difficult to know the type of each external speaker 200-1 to 200-8. According to an example embodiment, the exact calculation of the current position of each external speaker 200-1 to 200-8 should be preceded to guide the proper position for each speaker, and the position of each external speaker 200-1 to 200-8 may be calculated based on the triangulation using an audio signal as a basic principle.

According to an example embodiment, different audio may be output through the two speakers provided in the display device 100, and the positions of the external speakers may be identified based on the triangulation according to the process in which different audio is received in each of the external speaker 200-1 to 200-8 which are placed around the electronic device 100, and various UI services for arranging the speakers properly based on the identified positions may be provided. Hereinafter, various example embodiments will be described in detail with reference to the drawings.

Figure 13:
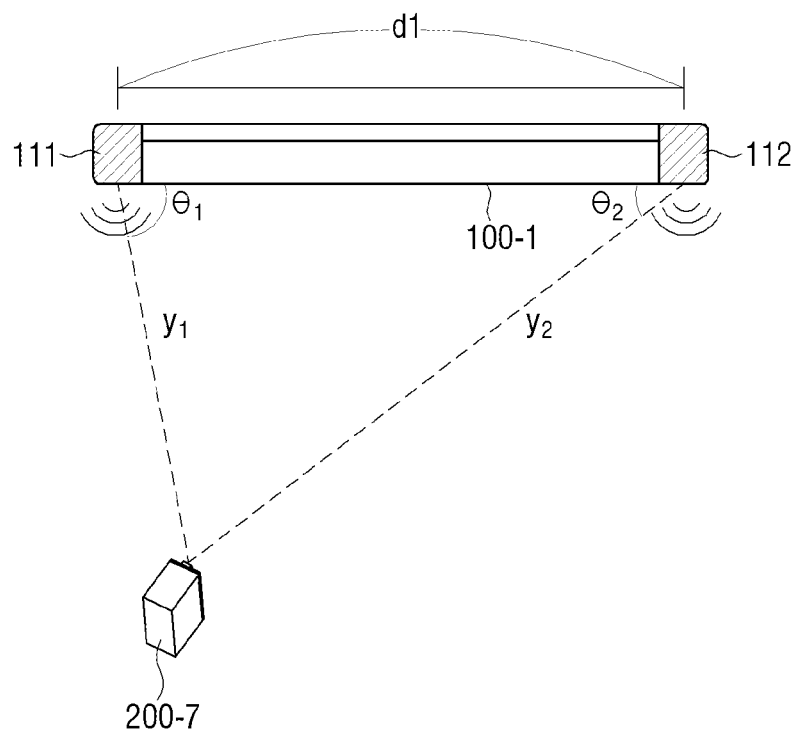
FIGS. 13 and 14 are diagrams illustrating a method for determining a distance to and a direction of an external speaker according to various example embodiments.
Figure 14:
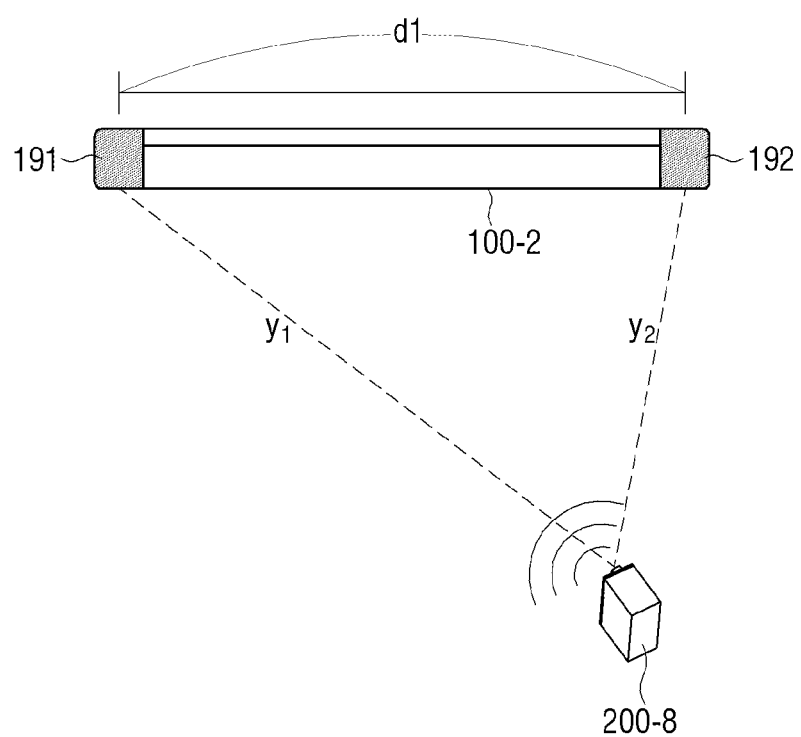

FIGS. 13 and 14 are diagrams illustrating a method for determining a distance to and a direction of an external speaker according to various example embodiments.

Referring to FIG. 13, the external speaker 200-7 may calculate distance $y_1$ that is the distance to a first speaker 111 provided on the left side of the display device 100-1 by multiplying the value calculated by subtracting D2 from $D1_L$ by velocity Vs (e.g., 340 m/s) of an audio signal. The external speaker 200-7 may also calculate distance $y_2$ that is the distance to a second speaker 112 provided on the right side of the display device 100-1 by multiplying the value calculated by subtracting D2 from $D1_L$ by the velocity Vs of an audio signal. When the $y_1$ and $y_2$ are calculated, the horizontal position of the external speaker 200-7 may be calculated by the triangulation. In other words, if it is said that distance $d_1$ between the display device 100-1 or the external speaker 200-7 and the first speaker 111 and the second speaker 112 is pre-stored, known information, the three elements of the triangle (the lengths of the three sides) may be determined when the distance $y_1$ to the first speaker 111 and the distance $y_2$ to the second speaker 112 are calculated, and the external speaker 200-7 may determine the horizontal position of the external speaker 200-7 by the triangulation. The external speaker 200-7 may transmit the information of the determined horizontal position to the display device 100-1.

Also, referring to FIG. 14, the display device 100-2 according to another example embodiment may include a first microphone 191 and a second microphone 192. The first microphone 191 and the second microphone 192 may be configured to receive an audio signal output from the external speakers 200. The first microphone 191 and a second microphone 192 may be placed apart from each other with a predetermined distance in the horizontal direction of the electronic device 100-2, and it may be desirable to implement the first microphone 191 to be embedded on the right end of the electronic device 100-2 and to implement the second microphone 192 to be embedded on the left end of the electronic device 100-2. In this case, the display device 100-2 may output a reference signal, which is a time reference signal, to the external speaker 200-8, and operate in a recording mode.

In this case, the external speaker 200-8 which receives the reference signal may output an audio signal, and transmit to the display device 100-2 the time information of time difference D3 between the time at which the reference signal is received and the time at which the audio signal is output. The processor 130 of the display device 100-2 may calculate the distance to and the direction of the external speaker 200-8 with reference to the display device 100-2 based on the value calculated by subtracting D3 from the time difference ($D2_R$) between the time at which the reference signal is output and the time at which the audio signal is received through the microphone, that is, $D2_R$–D3 ($D2_R$ minus D3), and the value calculated by subtracting D3 from the time difference ($D2_L$) between the time at which the reference signal is output and the time at which the audio signal is received through the microphone, that is, $D2_L$–D3 ($D2_L$ minus D3).

Referring to FIG. 14, the processor 130 may calculate the distance $y_1$ that is the distance to the first microphone 191 by multiplying the value calculated by subtracting D3 from $D2_R$ by the velocity value Vs (e.g., 340 m/s) of the audio signal. The processor may also calculate the distance $y_2$ that is the distance to the second microphone 191 by multiplying the value calculated by subtracting D3 from $D2_L$ by the velocity value Vs (e.g., 340 m/s) of the audio signal. When the $y_1$ and $y_2$ are calculated, the processor 130 may calculate the horizontal position of the external speaker 200-8 by the triangulation. In other words, if it is said that distance $d_1$ between the display device 100-1 and the first microphone 191 and the second microphone 192 is pre-stored, known information, the three elements of the triangle (the lengths of the three sides) may be determined when the distance $y_1$ that is the distance to the first microphone 191 and the distance $y_2$ that is the distance to the second microphone 192 are calculated, and the processor 130 may determine the horizontal position of the external speaker 200-8 by the triangulation.

According to another example embodiment, the electronic device 100 may further include a photographing unit (not illustrated). The processor 130 may photograph the external speaker by the photographing unit, and obtain the position information of the external speaker 200 through the image frame in which the photographed external speaker is included. The processor 130 may determine the distance and the direction between the electronic device 100 and the external speaker 200 by the obtained position information.

It has been described that the external speaker 200 determines the distance to and the direction of the external speaker 200 in FIGS. 13 to 14, but the processor 130 of the display device 100 may receive the information relating to the time at which the first audio signal and the second audio signal are received and determine the distance to and the direction of the external speaker 200.

Figure 15:
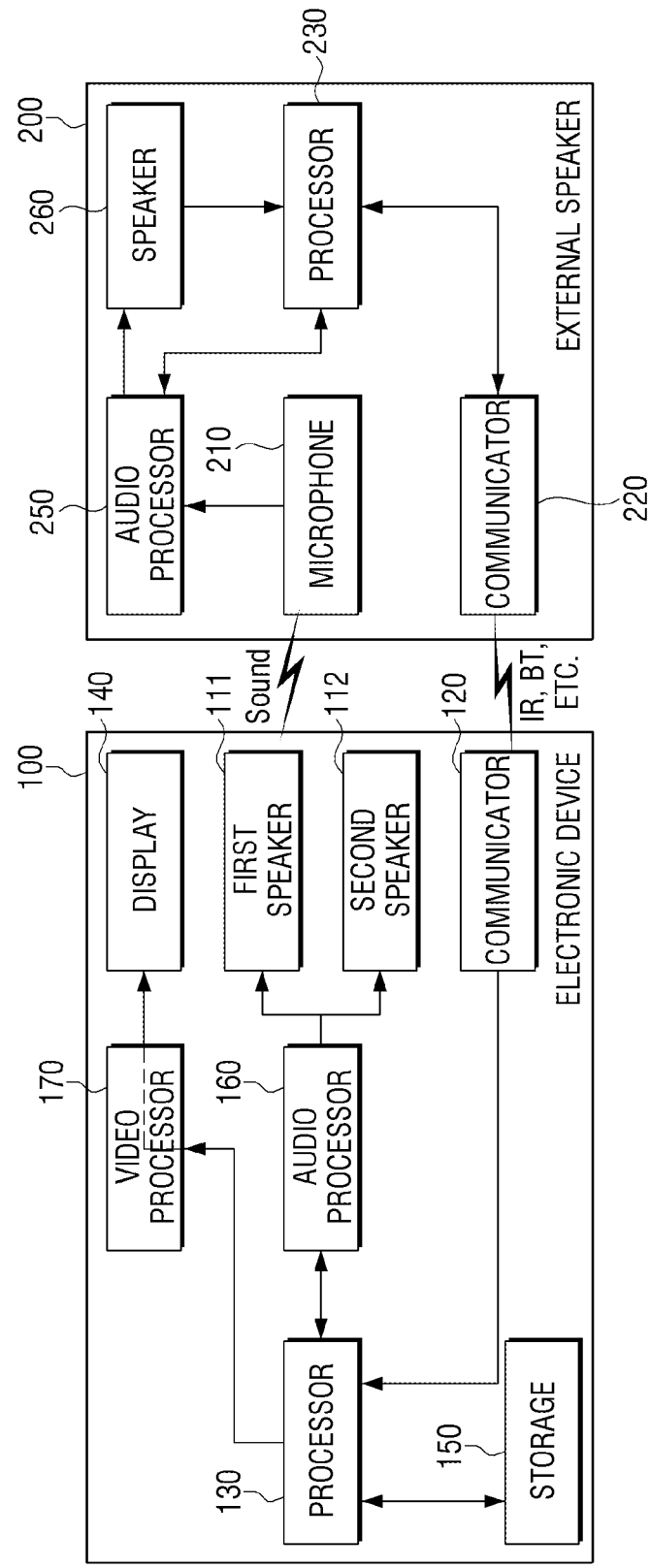
FIG. 15 is a block diagram briefly illustrating a configuration of an audio output system according to an example embodiment.

FIG. 15 is a block diagram briefly illustrating a configuration of an audio output system according to an example embodiment.

As illustrated in FIG. 15, the audio output system 1000 may be configured with the display device 100 and the external speaker 200. The electronic device 100 may include the first speaker 111, the second speaker 112, the communicator 120, the processor 130, the display 140, the storage 150, the audio processor 160 and the video processor 170.

The external speaker 200 may include the microphone 210, the communicator 220, the processor 230, the audio processor 250 and the speaker 260. Hereinafter, the detailed description for the elements which are overlapped with the elements illustrated in FIGS. 4A and 4B will not be repeated.

The external speaker 200 may transmit a reference signal which allows the display device 100 to output an audio signal through the communicator 220. The reference signal may be transmitted by an IR communication method or by a Bluetooth communication method. When the communicator 120 of the display device 100 receives a reference signal, the processor 130 of the display device 100 may convert a currently output audio signal into a first audio signal and a second audio signal which have different frequencies through the audio processor 160, and output the first audio signal and the second audio signal using the first speaker 111 and the second speaker 112. When the external speaker 200 detects the audio signals through the microphone 210, the audio processor 250 may classify the audio signals as the first audio signal and the second audio signal according to each frequency band.

The processor 230 of the external speaker 200 may determine the position including the direction of and the distance to the external speaker 200 with reference to the display device 100 using the information of the time at which each audio signal is detected, and transmit the information related to the determined position to the display device 100 through the communicator 220.

The processor 130 of the display device 100 may display through the display 140 a UI screen which displays the movement information of the external speaker 200 for arranging the external speaker 200 at the target position stored in the storage 150 based on the received information related to the position.

Figure 16:
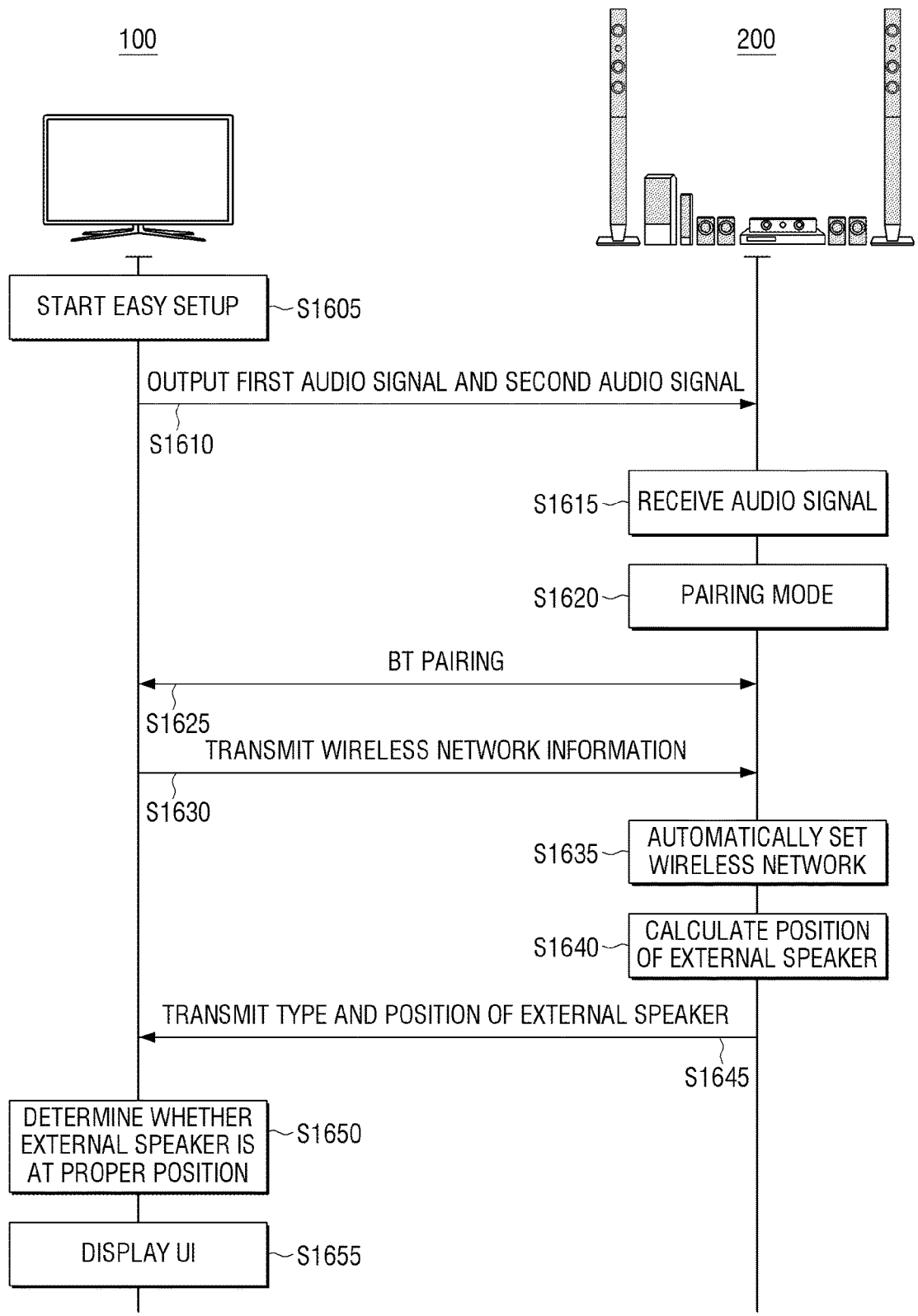
FIG. 16 is a sequence diagram briefly illustrating a configuration of an electronic device and of an external speaker according to an example embodiment.

FIG. 16 is a sequence diagram illustrating an electronic device and an external speaker briefly according to an example embodiment.

First, a user may select an easy setup service for installing the audio output system 100 on a UI displayed on the electronic device 100 (S1605).

The electronic device 100 may output the first audio signal and the second audio signal different from the first audio signal through the first speaker 111 and the second speaker 112 (S1610). The electronic device 100 may add to at least one of the first audio signal and the second audio signal a pin code which is based on a sound wave for pairing with the external speaker 200, and transmit the audio signals.

When the external speaker 200 receives the pin code from the received audio signal, the system may be converted into a pairing mode (S1620), and the electronic device 100 may be paired with the external speaker 200 as the pin code is automatically input (S1625). When the pairing is completed, the electronic device 100 may transmit wireless network connection information including the information of AP of Wi-Fi, etc. to the external speaker 200 (S1630), and the external speaker 200 may set the wireless network based on the received wireless network connection information (S1635).

The external speaker 200 may calculate the relative position of the external speaker 200 with reference to the electronic device 100 by the triangulation based on the time difference between the time at which the first audio signal is received and the second audio signal is received (S1640). The external speaker 200 may transmit the information related to the type and the calculated position of the external speaker 200 to the electronic device 100 (S1645), and the electronic device 100 may determine whether the current position of the external speaker 200 is consistent with the target position based on the information related to the type and the calculated position of the external speaker 200 (S1650).

If the current position of the external speaker 200 is not consistent with the target position, the electronic device 100 may display a UI which displays the movement information of the external speaker 200 for arranging the external speaker 200 at the target position, and if the current position of the external speaker 200 is consistent with the target position, the electronic device 100 may display a UI which indicates that the external speaker 200 is arranged at the target position (S1655).

Figure 17:
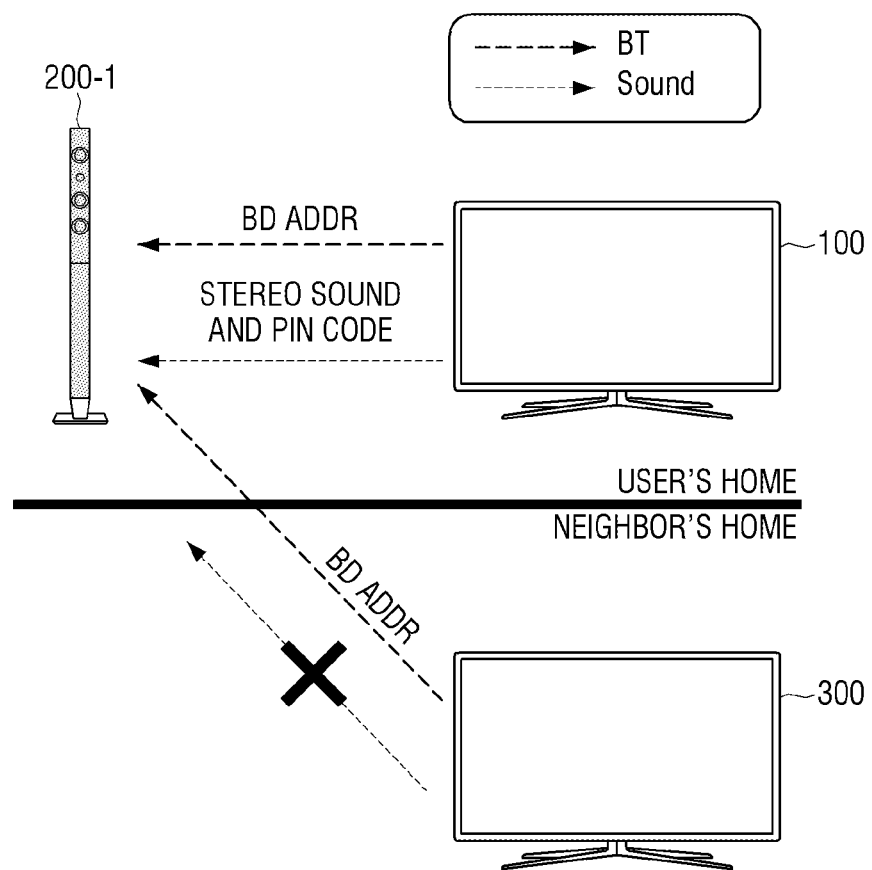
FIG. 17 is a diagram illustrating a process of pairing between an electronic device and an external speaker according to an example embodiment.

FIG. 17 is diagram illustrating a process of pairing between an electronic device and an external speaker.

As illustrated in FIG. 17, the electronic device 100 may scan a BT discovery signal (Bluetooth discovery signal) for searching for another Bluetooth device while outputting the first audio signal and the second audio signal different from the first audio signal. When the external speaker 200-1 is detected, the electronic device 100 may transmit a Bluetooth hardware device address (BD ADDR) to the external speaker 200-1, and also transmit to the external speaker 200-1 a pin code which is based on a wave sound for Bluetooth connection while outputting the first audio signal and the second audio signal.

Meanwhile, the other electronic device 300 which does not have authority for pairing may also transmit the BD ADDR to the external speaker 200-1 present inside the home according to the scanning of the BT discovery signal, but the external speaker 200-1 may not receive the audio signal and the pin code based on a wave sound which are output from the other electronic device 300 due to the barrier such as a wall, etc. and accordingly, the pairing with the other electronic device 300 may be prevented.

When the pairing is performed, the electronic device 100 may transmit an encoded setting value of the electronic device 100 to the external speaker 200-1. For example, the electronic device 100 may transmit wireless network connection information, etc. such as the information on the currently connected wireless AP, or the like, to the external speaker 200-1. When the external speaker 200-1 is connected via a wireless network, the external speaker 200-1 may transmit the information on the type and the position of the external speaker 200-1 to the electronic device 100.

FIGS. 18A and 18B are diagrams illustrating a UI screen which displays the information on the movement of an external speaker according to another example embodiment.

If the electronic device 100 includes the display 140, the processor 130 may display a user interface (UI) screen which displays the movement information of the external speaker 200 for arranging the external speaker 200 at the target position if the position of the external speaker 200 is not consistent with the target position corresponding to the external speaker 200. The UI screen may be a screen which displays the determined position of the external speaker 200 and the proper position at which the external speaker 200 should be arranged. The UI screen may also be the phrase which guides the direction to which the external speaker 200 should be moved and the distance in which the external speaker 200 should be placed. The movement information may include the information on the current position of the external speaker 200 and the information on the target position for arranging the external speaker 200.

The UI may display a 2D or 3D space layout, and may display the position of the external speaker 200 with reference to the display device 100 in the space layout. If the external speaker 200 is plural, the position of each external speaker 200 may be displayed. The space layout is the identification information related to the external speaker 200, and in the space layout, text (e.g., the type of speakers and the information on the left and right) or an image (e.g., the real images, the exterior images or an icon of the speakers) may be displayed.

As illustrated in FIG. 18A, the processor 130 may display the position 1831 of the electronic device 100, each target position 1832 to 1836 corresponding to a plurality of external speakers 200-1 to 200-5, respectively, and each of the currently determined positions 1837 to 1841 of the plurality of external speakers 200-1 to 200-5. Accordingly, a user may move the external speakers 200-1 to 200-5 to each target position 1832 to 1836 which corresponds to the external speakers 200-1 to 200-5, respectively, while checking the positions of the plurality of external speakers 200-1 to 200-5 displayed on the electronic device 100. The UI displayed on the screen may display arrow-shaped icons 1842 to 1845 for a user to know the movement direction more intuitively.

If the position of the external speaker 200 is consistent with the target position set in the external speaker 200, the processor 130 may display a UI screen which indicates that the external speaker 200 is positioned at the target position properly as the external speaker 200 is displayed properly.

As illustrated in FIG. 18A, if it is determined that the current position 1841 of the external speaker 200-5 of the plurality of external speakers 200-1 to 200-5 approaches within a predetermined scope in the corresponding target position 1836, the processor 130 may display the phrase, etc. such as "OK", or the like, which indicates that the external speaker 200-5 is positioned at the target position 1836.

The movement information may also include the information of the direction of and the distance to the target position corresponding to each of the external speakers 200-1 to 200-5.

As illustrated in FIG. 18B, the processor 130 may display the message "the left rear speaker needs to be rearranged. Please move the speaker 50 cm to the right in 30° direction 1817. Such message may be displayed as illustrated in FIG. 18B, or be displayed in small letters on the lower end of the display 140 on which content is displayed. Accordingly, the electronic device 100 may display the movement information with minimizing the interruption to the content viewing of a user while the user is viewing the content.

The processor 130 may also output through at least one of the first speaker 111 and the second speaker 112 a voice which guides a user to move each of the external speakers 200-1 to 200-5 to the corresponding target position.

The processor 130 may control the operations of each of the external speakers 200-1 to 200-5 based on the information on the position of each of the external speakers 200-1 to 200-5. For example, the processor 130 may receive the position information of the first external speaker 200-1 and of the second external speaker 200-2 from the first external speaker 200-1 and the second external speaker 200-2, respectively, through the communicator 120. If it is determined that the second external speaker 200-2 is positioned closer to the target position which corresponds to the first external speaker 200-1 than the first external speaker 200-1, the movement information of the second external speaker 200-2 for arranging the second external speaker 200-2 at the target position corresponding to the first external speaker 200-1 may be provided. Also, when second external speaker 200-2 is arranged at the target position corresponding to the first external speaker 200-1, the processor 130 may transmit a control signal for operating the second external speaker 200-2 as the first external speaker 200-1. Accordingly, the second external speaker 200-2 may operate as the first external speaker 200-1.

By the same method, the processor 130 may provide the movement information of the first external speaker 200-1 for arranging the first external speaker 200-1 at the target position corresponding to the second external speaker 200-2, and accordingly, the first external speaker 200-1 may operate as the second external speaker 200-2.

If it is determined that the left rear speaker 200-4 is positioned closer to the target position 1205 which corresponds to the right rear speaker 200-5 than the right rear speaker 200-5, a UI which displays the movement information for arranging the left rear speaker 200-4 at the target position 1205 corresponding to the right rear speaker 200-5. Such UI may be displayed as illustrated in FIG. 18A or in FIG. 18B. When the left rear speaker 200-4 is arranged at the corresponding target position 1205, the processor 130 may transmit to the left rear speaker 200-4 a control signal for operating the left rear speaker 200-4 as the right rear speaker 200-5.

Also, as illustrated in FIG. 19, the message 1900 "the left rear speaker is changed to operate as the right rear speaker" may be displayed.

The processor 130 may also transmit the movement information for arranging the external speaker 200 at the target position to the external display device connected through the communicator 120 via cable or wirelessly. The external display device which receives the movement information may display the UI screen described above, and the effect thereof will be the same as described.

The movement information may be provided by the external speaker 200. For example, the external speaker 200 may determine whether the external speaker 200 is positioned at the target position by itself, and only if it is positioned at the target position, the external speaker 200 may output an alarm sound for a user to know that the external speaker 200 is positioned at the proper position. Also, the external speaker 200 may include an LED, and if the external speaker 200 is positioned at the target position, the external speaker 200 may output light of a certain color to the LED. Accordingly, a user may see the light of the LED and know whether the external speaker 200 is positioned at the proper position.

FIGS. 20, 21, 22 and 23 are flowcharts illustrating a control method of an electronic device and a peripheral device according to various example embodiments.

According to the control method of the electronic device illustrated in FIG. 20, the electronic device 100 may output a first audio signal and a second audio signal different from the first audio signal through a first speaker and a second speaker (S2010). In this case, when a reference signal is received from the peripheral device 200, the electronic device 100 may output the first audio signal and the second audio signal through the first speaker and the second speaker.

The information related to the time at which the first audio signal is received and the time at which the second audio signal is received from the peripheral device 200 which receives the first audio signal and the second audio signal (S2020). The received information may include the information in which the state that the first audio signal and the second audio signal are sequentially received through a microphone provided in the peripheral device 200 is recorded or the information which includes the information of the time at which the first audio signal is received and the time at which the second audio signal is received sequentially.

The distance to and the direction of the peripheral device 200 may be determined with reference to the electronic device 100 based on the received information (S2030).

In operation S2030, the distance and the direction may be determined based on first time information and second time information which are obtained from the received information and which indicate the time at which the first audio signal is received and the time at which the second audio signal is received in the peripheral device, respectively, and third time information which indicates the time difference between the time at which the reference signal is received and the time at which the first audio signal and the second audio signal are output.

The first speaker and the second speaker may be implemented as the speakers which are arranged on the right and left of the electronic device 100, and in operation S2030, the right side distance may be calculated by multiplying the time difference between the first time information and the third time information by a velocity value of the audio signal, and the left side distance may be calculated by multiplying the time difference between the second time information and the third time information by a velocity value of the audio signal. Also, the distance and the direction may be determined based on the calculated right and left side distances and the distance between the first speaker and the second speaker.

The electronic device 100 may provide various services based on the position information of the peripheral device 200 obtained by the above-described method.

FIG. 21 is a flowchart illustrating a control method of a peripheral device according to another example embodiment.

According to the control method of the peripheral device illustrated in FIG. 21, when the first audio signal and the second audio signal which are output from each of a plurality of speakers provided in the external electronic device 100 are received through a microphone, the reception state may be recorded (S2110). Before the operation, the peripheral device 200 may output a reference signal to the electronic device 100 and operate in a recording mode and record the reception state of the first audio signal and the second audio signal.

The first time information and the second time information which indicate the time at which the first audio signal is received and the time at which the second audio signal is received, respectively, may be obtained from the information in which the received audio signals are recorded (S2120).

The distance to and the direction of the peripheral device 200 may be determined with reference to the electronic device 100 based on the obtained first time information and second time information (S2130).

The peripheral device 200 may receive from the electronic device 100 the third time information of the time difference between the time at which a reference signal is received, and the time at which the first audio signal is output and the time at which the second audio signal is output.

In operation S2130, the distance and direction may be determined based on the first to third time information.

FIG. 22 is a flowchart illustrating a control method of an electronic device according to another example embodiment.

The position information of an external speaker may be received from the external speaker (S2210). The electronic device may output the first audio signal and the second audio signal through the first speaker and the second speaker, respectively, and receive the first audio signal and the second audio signal.

Whether the external speaker is positioned at the target position may be determined based on pre-stored information on the target position corresponding to the external speaker and the received position information (S2220).

If the external speaker is not positioned at the target position, the movement information for arranging the external speaker at the target position may be provided (S2230). The movement information may include the information on the current position of the external speaker and the information on the target position for arranging the external speaker. The movement information may also include the information on the direction of and the distance to the target position from the external speaker.

The movement information may be provided by displaying a UI screen which displays the movement information of the external speaker. The movement information may also be provided by outputting a voice which guides a user to move the external speaker to the target position through at least one of the first speaker and the second speaker.

FIG. 23 may be a flowchart illustrating a control method of an electronic device according to an example embodiment.

The audio signals output from an external speaker through the first microphone and the second microphone may be received (S2310). If the external speakers are plural, the audio signals may be received from the plurality of external speakers in a predetermined order.

The position of the external speaker may be determined based on the time at which the first microphone receives the audio signal and the time at which the second microphone receives the audio signal (S2320).

Whether the external speaker is positioned at the target position may be determined based on predetermined information on the target position corresponding to the external speaker (S2330).

If the external speaker is not positioned at the target position, the movement information of the external speaker for arranging the external speaker at the target position may be provided (S2340). If the external speaker is plural, the movement information of the external speaker for arranging the external speaker which currently outputs a current audio signal among the sequentially output audio signals at the corresponding target position may be provided.

According to the above-described various example embodiments, the position of each device may be determined using the electronic device which can output audio and the peripheral device which can receive audio, and the position information may be used in a variety of services. Also, when an ordinary user installs an audio output system such as a home theater, the user can arrange an external speaker at the proper position conveniently without any help from an expert.

The control method of an electronic device and a peripheral device according to the aforementioned various example embodiments may be implemented by a program, and the program may be provided to a display system.

For example, the non-transitory computer readable medium in which the program which performs the operation of outputting the first audio signal and the second audio signal different from the first audio signal through the first speaker and the second speaker, the operation of receiving the information related to the time at which the first audio signal is received and the time at which the second audio signal is received from the peripheral device which receives the first audio signal and the second audio signal through the microphone, and the operation of determining the distance to and the direction of the peripheral device with reference to the electronic device based on the received information is stored may be provided.

A non-transitory computer readable medium may refer to a machine-readable medium or device that stores data semi-permanently and not for a short period of time, such as a register, cache, memory, or the like. The specific examples of the non-transitory computer readable medium may be a compact disc (CD), a digital versatile disc (DVD), a hard disk, a Blu-ray disc, a universal serial bus (USB) stick, a memory card, a ROM, etc.

The foregoing exemplary embodiments are merely exemplary and are not to be construed as limiting the present disclosure. The description of the example embodiments is intended to be illustrative, and not to limit the scope of the disclosure, as defined by the appended claims, and many alternatives, modifications, and variations will be apparent to those skilled in the art.

What is claimed is:

1. An electronic device comprising:
a first speaker;
a second speaker;
a communicator; and
a processor configured to:
control the first speaker and the second speaker to output a first audio signal and a second audio signal according to an event,
receive, from a peripheral device, information on a first time at which the first audio signal output by the first speaker is received by the peripheral device and a second time at which the second audio signal output by the second speaker is received by the peripheral device through the communicator,
obtain a distance from the electronic device to the peripheral device and a direction of the peripheral device with a reference to the electronic device based on the received information, and
provide movement information for positioning the peripheral device at a target position,
wherein the processor is further configured to obtain the distance and the direction based on the information on the first time and the second time and information on a third time at which the event occurs.

2. The electronic device of claim 1, further comprising:
a storage configured to store information on the target position which corresponds to the peripheral device,
wherein the processor is further configured to determine whether the peripheral device is positioned at the target position based on the distance and the direction, and, if the peripheral device is not positioned at the target position, to provide the movement information of the peripheral device, the movement information is for arranging the peripheral device at the target position.

3. The electronic device of claim 1, wherein the received information further comprises information indicating that the first audio signal and the second audio signal different from the first audio signal are sequentially received through a microphone provided in the peripheral device.

4. The electronic device of claim 1, wherein the received information further comprises information of the first time and the second time at which the first audio signal and the second audio signal different from the first audio signal are respectively sequentially received through a microphone provided in the peripheral device.

5. The electronic device of claim 1, wherein the processor is further configured to control the first speaker and the second speaker to output the first audio signal and the second audio signal simultaneously in response to receiving a reference signal from the peripheral device.

6. The electronic device of claim 5, wherein the processor is further configured to determine the distance and the direction based on the first time and the second time that are obtained from the received information, and a fourth time which indicates a time difference between a time at which the reference signal is received and a time at which the first audio signal and the second audio signal are output.

7. The electronic device of claim 6, wherein the first speaker and the second speaker are provided in a right side and a left side of the electronic device, respectively, and
the processor is further configured to calculate a right side distance by multiplying a time difference between the first time and the fourth time by a velocity value of the first audio signal, calculates a left side distance by multiplying a time difference between the second time and the fourth time by a velocity value of the second audio signal, and determine the distance and the direction based on the right side distance and the left side distance and a distance between the first speaker and the second speaker.

8. The electronic device of claim 1, wherein the processor is further configured to control the first speaker and the second speaker to output the first audio signal and the second audio signal simultaneously according to the event.

9. The electronic device of claim 2, wherein the movement information comprises information on a relative position of the peripheral device with the reference to the electronic device.

10. The electronic device of claim 9, further comprising:
a display;
wherein the processor is further configured to display a user interface (UI) screen which indicates the relative position through the display.

11. The electronic device of claim 10, wherein the processor is further configured to determine whether the peripheral device is positioned at the target position, and display through the display the UI screen which displays the movement information of the peripheral device.

12. The electronic device of claim 2, wherein the peripheral device comprises a first external speaker and a second external speaker,
the target position is a position corresponding to the first external speaker, and
in response to determining that the second external speaker is positioned closer to the target position than the first external speaker based on the information on the first time at which the first audio signal is received and the second time at which the second audio signal is received, respectively, the processor is further configured to provide movement information of the second external speaker which is for arranging the second external speaker at the target position corresponding to the first external speaker, and in response to the second external speaker being arranged at the target position corresponding to the first external speaker, the processor is further configured to transmit, to the second external speaker, a control signal for operating the second external speaker as the first external speaker.

13. The electronic device of claim 2, wherein in response to the peripheral device being positioned at the target position, the processor is further configured to provide information informing that the peripheral device is arranged at the target position.

14. A method for controlling an electronic device comprising a first speaker and a second speaker, the method comprising:

controlling the first speaker and the second speaker to output first audio signal and a second audio signal through the first speaker and the second speaker according to an event;
receiving, from a peripheral device, information on a first time at which the first audio signal output by the first speaker is received by the peripheral device and a second time at which the second audio signal output by the second speaker is received by the peripheral device;
obtaining a distance from the electronic device to the peripheral device and a direction of the peripheral device with reference to the electronic device based on the received information; and
providing movement information for positioning the peripheral device at a target position,
wherein the obtaining comprises obtaining the distance and the direction based on the information on the first time and the second time and information on a time at which the event occurs.

15. A peripheral device which communicates with an electronic device comprising a plurality of speakers, the peripheral device comprising:
an audio receiver;
a communicator configured to communicate with the electronic device; and
a processor configured to:
in response to a first audio signal and a second audio signal which are output, according to an event, from a first speaker and a second speaker provided in the electronic device being received sequentially through the audio receiver, obtain information on a first time at which the first audio signal is received and a second time at which the second audio signal is received, respectively, from information which records the first audio signal and the second audio signal that are received from the electronic device,
obtain a distance from the electronic device to the peripheral device and a direction of the peripheral device with reference to the electronic device based on the information on the first time and the second time, and
provide movement information for positioning the peripheral device at a target position,
wherein the processor obtains the distance and the direction based on the information on the first time and the second time and information on a time at which the event occurs.

16. The electronic device of claim 1, wherein the second audio signal is different from the first audio signal.

* * * * *